US012099358B2

(12) United States Patent
Song

(10) Patent No.: US 12,099,358 B2
(45) Date of Patent: Sep. 24, 2024

(54) AUTONOMOUS MACHINE AND METHOD OF CONTROLLING THE SAME

(71) Applicant: SINGPILOT PTE LTD, Singapore (SG)

(72) Inventor: Zhiwei Song, Singapore (SG)

(73) Assignee: SINGPILOT PTE LTD, Singapore (SG)

( * ) Notice: Subject to any disclaimer, the term of this patent is extended or adjusted under 35 U.S.C. 154(b) by 0 days.

(21) Appl. No.: 17/916,051

(22) PCT Filed: Apr. 27, 2020

(86) PCT No.: PCT/SG2020/050255
§ 371 (c)(1),
(2) Date: Sep. 30, 2022

(87) PCT Pub. No.: WO2021/221560
PCT Pub. Date: Nov. 4, 2021

(65) Prior Publication Data
US 2023/0315092 A1  Oct. 5, 2023

(51) Int. Cl.
*G05D 1/00* (2024.01)
(52) U.S. Cl.
CPC ......... *G05D 1/0088* (2013.01); *G05D 1/0212* (2013.01)
(58) Field of Classification Search
CPC ...... G05D 1/0088; G05D 1/0212; G05D 1/10; G05D 1/0278; G01C 21/00; G05B 19/00
See application file for complete search history.

(56) References Cited

FOREIGN PATENT DOCUMENTS

| CN | 108460779 B | * | 9/2021 | ............. G01C 21/00 |
| CN | 118010024 A | * | 5/2024 | |

OTHER PUBLICATIONS

Machine Translation of CN-118010024-A retrieved from Clarivate on Jun. 15, 2024 (Year: 2024).*
Machine Translation of CN-108460779-B retrieved from Clarivate on Jun. 15, 2024 (Year: 2024).*
International Search Report and Written Opinion of the corresponding PCT application No. PCT/SG2020/050255 mailed on Jan. 11, 2021.
Ignacio Mas et al., "Formation Control for Multi-Domain Autonomous Vehicles Based on Dual Quaternions," 2017 International Conference on Unmanned Aircraft Systems (ICUAS), IEEE, 2017, pp. 723-730.

(Continued)

*Primary Examiner* — Thomas Ingram
(74) *Attorney, Agent, or Firm* — Idea Intellectual Limited; Margaret A. Burke; Sam T. Yip

(57) ABSTRACT

The present application discloses an autonomous machine and methods of controlling the autonomous machine. The present application also relates to a computing system for controlling movement of the autonomous machine. The autonomous machine comprises a movable component, a representation unit, a transformation unit communicatively coupled to the representation unit and a driving mechanism coupled to the movable component and the transformation unit for moving the movable component. In particular, poses of every part of the autonomous machine may be transformed back and forth by simply mathematical addition and subtraction.

22 Claims, 11 Drawing Sheets

(56) References Cited

OTHER PUBLICATIONS

Nikolas Trawny et al., "Interrobot Transformations in 3-D," IEEE Transactions on Robotics, 2010, pp. 226-243, vol. 26, No. 2.
Isuru S. Godage et al., "Dual Quaternion Based Modal Kinematics for Multisection Continuum Arms," 2015 IEEE International Conference on Robotics and Automation (ICRA), IEEE, 2015, pp. 1416-1422.
Alfredo Valverde et al., "Modeling of Spacecraft-Mounted Robot Dynamics and Control Using Dual Quaternions," 2018 Annual American Control Conference (ACC), AACC, 2018, pp. 670-675.

\* cited by examiner

AUTONOMOUS MACHINE AND METHOD OF CONTROLLING THE SAME

The present application relates to an autonomous machine and methods of controlling the autonomous machine. The present application also relates to a computing system for controlling movement of the autonomous machine.

Operation of an autonomous machines such as robotics and autonomous vehicles involves many coordinate frames; and tracking of the coordinate frames and pose transformations within the autonomous machines is very critical for autonomous controlling of the autonomous machines, since positions of two objects (such as the autonomous machine and a target the autonomous machine approaches to) can be compared only in a same coordinate frame. Currently, transformation matrix is commonly adopted between different coordinate frames; however, keeping track of coordinate frames and pose transformation becomes a common pain point for developers due to complexity of the transformation matrix between different coordinate frames. In addition, bugs are often generated when developers improperly applied the transformation matrix.

Instead of the transformation matrix, several methods are recently proposed for transforming between different coordinate frames. For example, MAS IGNACIO et al in the article "formation control for multi-domain autonomous vehicles based on dual quaternions" (IEEE, 13 Jun. 2017, pages 723-730, XP033131723) propose a representation method based on dual quaternions in unmanned networked multi-robot systems. However, the dual quaternions are quiet complex and thus computationally less efficient and prone to errors in the coordination transformation. GODAGE ISURU S et al in the article "Dual Quaternion based modal kinematic for multisection continuum arms" (IEEE, 26 May 2015, pages 1416-1422, XP033168590) and VALVERDE ALFREDO et al in the article "Modeling of Spacecraft-Mounted Robot Dynamics and Control Using Dual Quaternions" (IEEE, 27 Jun. 2018, pages 670-675), XP033387281) also adopts dual quaternion (DQ) kinematics for robotic arms of robotics. Accordingly, they also have similar defects as MAS IGNACIO et al. In addition, TRAWNY N et al in the article "Interrobot Transformations in 3-D" (IEEE, 1 Apr. 2010, pages 226-243, XP011332974) proposes an algebraic method for inter-robot transformations in 3D to compute the relative translation and rotation between two robots. However, the algebraic method is also complex and the transformations of position and orientation do not have a fixed sequence.

Instead of the transformation matrix and the recently proposed methods discussed above, the subject invention provides a simple and easy way for pose transformation between coordinate frames by unifying pose of the autonomous machine and the transformation. In particular, a computing system is also disclosed to operate the pose transformation for controlling movement of the autonomous machine. Accordingly, kinematics of the autonomous machine is also illustrated for applications of robotic arms and pose estimation of autonomous vehicles.

As a first aspect, the present application discloses an autonomous machine. The autonomous machine comprises one or more movable components, a representation unit, a transformation unit communicatively coupled to the representation unit and one or more driving mechanism coupled to the movable component and the transformation unit for moving the movable component(s).

Each component/object of the autonomous machine or each component/object in the environment has a pose (x, y, z; $\psi$, $\theta$, $\phi$) in a coordinate frame (x-o-y-z) which has three axes (i.e. X-axis, Y-axis and Z-axis) and a coordinate origin (i.e. o-point). The pose (x, y, z; $\psi$, $\theta$, $\phi$) is further divided into a position (x, y, z) and an orientation ($\omega$, $\theta$, $\phi$). The position (x, y, z) has respective projections on the X-axis, Y-axis and Z-axis as x, y and z; while the orientation ($\psi$, $\theta$, $\phi$) is expressed as Euler angles $\psi$, $\theta$ and $\phi$ around the Z-axis, Y-axis and X-axis respectively. The orientation may be expressed in other rotation order, such as ($\phi$, $\theta$, $\psi$) as Euler angles $\phi$ for X-axis, $\theta$ for Y-axis, and w for Z-axis respectively. The orientation may be expressed in other forms. In some implementations, the orientation is expressed as a direction of a unit vector ($x_u$, $y_u$, $z_u$) from the coordinate origin; while in other implementations, the orientation is expressed in other forms of the Euler angles, such as a 3×3 rotation matrix or a quaternion.

The pose (x, y, z; $\psi$, $\theta$, $\phi$) is represented in the representation unit to a represented pose (x, y, z; $q_w$, $q_x$, $q_y$, $q_z$) in the coordinate frame (x-o-y-z). Accordingly, the orientation ($\psi$, $\theta$, $\phi$) is represented to a represented orientation ($q_w$, $q_x$, $q_y$, $q_z$) in quaternion.

During the application of autonomous machine, a first pose ($x_1$, $y_1$, $z_1$; $\psi_1$, $\theta_1$, $\phi_1$) of an object in the coordinate frame (x-o-y-z) needs to be transformed to a second pose of another object in the same coordinate frame (x-o-y-z). The object may comprise either a component of the autonomous machine (such as a sensor) or a component in the environment external to the autonomous machine (such as an obstacle). Similarly, another object refers to a different object which may comprise either another component of the autonomous machine or another component in the environment external to the autonomous machine. Alternatively, the first pose of the object needs to be transformed to a new pose of the same object in the same coordinate (x-o-y-z) after a movement. Similarly, the second pose or the new pose ($x_2$, $y_2$, $z_2$; $\psi_2$, $\theta_2$, $\phi_2$) has a second position ($x_2$, $y_2$, $z_2$) and a second orientation ($\psi_2$, $\theta_2$, $\phi_2$). The first pose ($x_1$, $y_1$, $z_1$; $\psi_1$, $\theta_2$, $\phi_1$) is also represented in the representation unit to a first represented pose ($x_1$, $y_1$, $z_1$; $q_{w1}$, $q_{x1}$, $q_{y1}$, $q_{z1}$) in quaternion. The second pose ($x_2$, $y_2$, $z_2$; $\psi_2$, $\theta_2$, $\phi_2$) is also represented in the representation unit to a second represented pose ($x_2$, $y_2$, $z_2$; $q_{w2}$, $q_{x2}$, $q_{y2}$, $q_{z2}$) in quaternion.

Traditionally, a serial of translations and rotations will be applied to the first pose in any order via serials of operations of matrix multiplication, which makes the transformation very complicated and thus may generate bugs during the transformation.

For simplifying transformation process of the first pose ($x_1$, $y_1$, $z_1$; $\psi_1$, $\theta_1$, $\phi_1$) to the second pose ($x_2$, $y_2$, $z_2$; $\psi_2$, $\theta_2$, $\phi_2$), The transformation unit comprises a general transformation ($x_i$, $y_i$, $z_i$; $\psi_i$, $\theta_i$, $\phi_i$) is defined and is to be unified with the pose (x, y, z; $\psi$, $\theta$, $\phi$), thus simpler operation of addition on the pose in whole could be applied in the transformation process to transform the poses from first pose ($x_1$, $y_1$, $z_1$; $\psi_1$, $\theta_1$, $\phi_1$) to second pose ($x_2$, $y_2$, $z_2$; $\psi_2$, $\theta_2$, $\phi_2$) rather than operations of matrix multiplication.

Since both the position (x, y, z) in pose and the translation ($x_i$, $y_i$, $z_i$) in the general transformation may be denoted as a vector (x, y, z), the position (x, y, z) in the pose may be seen as a translation ($x_i$, $y_i$, $z_i$) in the general transformation while the translation ($x_i$, $y_i$, $z_i$) in the general transformation may be also seen as a position (x, y, z) in pose. Therefore, the position (x, y, z) in pose and the translation ($x_i$, $y_i$, $z_i$) in the general transformation are unified for satisfying the mathematical addition.

If Euler angels of the orientation ($\psi_1$, $\theta_1$, $\phi_1$) is expressed in a fixed order of Z-Y-X axis (yaw-pitch-roll), i.e. rotating the first pose $(x_1, y_1, z_1; \psi_1, \theta_1, \phi_1)$ and the coordinate frame (x-o-y-z) for $\psi_i$ radians around Z-axis and resulting in a Z-axis rotated pose $(x_{1z}, y_{1z}, z_{1z}; \psi_{1z}, \theta_{1z}, \phi_{1z})$ and a Z-axis rotated coordinate frame $(x_z\text{-o-}y_z\text{-}z_z)$; then rotating the Z-axis rotated pose $(x_{1z}, y_{1z}, z_{1z}; \psi_{1z}, \theta_{1z}, \phi_{1z})$ and the Z-axis rotated coordinate frame $(x_z\text{-o-}y_z\text{-}z_z)$ for $\theta_i$ radians around the new Y-axis and resulting in a Y-axis rotated pose $(x_{1zy}, y_{1zy}, z_{1zy}; \psi_{1zy}, \theta_{1zy}, \phi_{1zy})$ and a Y-axis rotated coordinate frame $(x_{zy}\text{-o-}y_{zy}\text{-}z_{zy})$; and finally rotating the Y-axis rotated pose $(x_{1zy}, y_{1zy}, z_{1zy}; \psi_{1zy}, \theta_{1zy}, \phi_{1zy})$ and the Y-axis rotated coordinate frame $(x_{zy}\text{-o-}y_{zy}\text{-}z_{zy})$ for di radians around the new X-axis for completing the rotation $(\psi_i, \theta_i, \phi_i)$ with a X-axis rotated pose $(x_{1zyx}, y_{1zyx}, z_{1zyx}; \psi_{1zyx}, \theta_{1zyx}, \phi_{1zyx})$ and a X-axis rotated coordinate frame $(x_{zyx}\text{-o-}y_{zyx}\text{-}z_{zyx})$. However, all the Z-axis rotation, the Y-axis rotation and the X-axis rotation do not satisfy mathematical addition. Therefore, the first orientation $(\psi_1, \theta_1, \phi_1)$ is represented in quaternion expression $(q_{w1}, q_{x1}, q_{y1}, q_{z1})$, which is calculated from the Euler angels. Simiarly, the rotation $(\psi_i, \theta_i, \phi_i)$ may be also represented in quaternion expression as a represented rotation $(q_{wi}, q_{xi}, q_{yi}, q_{zi})$. Since the mathematical addition could be defined as the traditional multifaction on quaternion and is applicable to the quaternion expression, the represented orientation $(q_w, q_x, q_y, q_z)$ in the pose and the represented rotation $(q_{wi}, q_{xi}, q_{yi}, q_{zi})$ in the general transformation are unified for satisfying the mathematical addition. Finally, the order of translation $(x_i, y_i, z_i)$ and the represented rotation $(q_{wi}, q_{xi}, q_{yi}, q_{zi})$ in the general transformation is defined that the represented rotation $(q_{wi}, q_{xi}, q_{yi}, q_{zi})$ is after the translation $(x_i, y_i, z_i)$. Therefore, the represented pose (x, y, z; $q_w, q_x, q_y, q_z$) is unified with the represented general transformation $(x_i, y_i, z_i; q_{wi}, q_{xi}, q_{yi}, q_{zi})$ for satisfying the mathematical addition.

Particularly, to transform the first pose $(x_1, y_1, z_1; \psi_1, \theta_1, \phi_1)$ in coordinate frame (x-o-y-z) to second pose $(x_2, y_2, z_2; \psi_2, \theta_2, \phi_2)$ in coordinate frame (x-o-y-z), a new pose $(x_i, y_i, z_i; \psi_i, \theta_i, \phi_i)$ in coordinate frame (x'-o'-y'-z') is added to the first pose $(x_1, y_1, z_1; \psi_1, \theta_1, \phi_1)$, where the coordinate frame (x'-o'-y'-z') is defined by the first pose $(x_1, y_1, z_1; \psi_1, \theta_1, \phi_1)$. The pose $(x_i, y_i, z_i, \psi_i, \theta_i, \phi_i)$ is another representation of the second pose $(x_2, y_2, z_2; \psi_2, \theta_2, \phi_2)$ in coordinate frame (x'-o'-y'-z'), meanwhile the pose $(x_i, y_i, z_i; \psi_i, \theta_i, \phi_i)$ is also the general transformation from first pose $(x_1, y_1, z_1; \psi_1, \theta_1, \phi_1)$ in coordinate frame (x-o-y-z) to second pose $(x_2, y_2, z_2; \psi_2, \theta_2, \phi_2)$ in coordinate frame (x-o-y-z).

The driving mechanism moves the movable component according to the represented transformation $(x_i, y_i, z_i; q_{wi}, q_{xi}, q_{yi}, q_{zi})$. As discussed above, the movable component is configured to firstly translate the movable object according to the represented translation $(x_i, y_i, z_i)$ and secondly rotate the removable object according to the represented rotation $(q_{wi}, q_{xi}, q_{yi}, q_{zi})$ for completing the represented transformation $(x_i, y_i, z_i; q_{wi}, q_{xi}, q_{yi}, q_{zi})$ to the movable object.

The movable component optionally comprises a moving body configured in the coordinate frame (x-o-y-z); and a manipulator mounted on the moving body, and the manipulator is configured in a manipulator coordinate frame (x'-o'-y'-z'). The manipulator may have various end effectors to interact with its surrounding environment, according to specific applications of the manipulator. The end effector may comprise an impactive gripper physically grasping by direct impact on a target (such as a jaw or a claw), an ingressive gripper physically penetrating a surface of a target (such as a pin, a needle or a hackle), an astrictive gripper applying to a target surface by vacuum, magneto- or electro-adhesion, a contigutive gripper requiring direct contact for adhesion (such as glue, surface tension or freezing), or any combination of the foregoing grippers. Since the moving body and the manipulator can only be compared in a same coordinate frame, the coordinate frame (x-o-y-z) of the moving body and the manipulator coordinate frame (x'-o'-y'-z') of the manipulator should be transformative to each other. Current transformative methods generally involve mathematical multiplication of a transformation matrix which is complex and easy for developers to make bugs. In contrast, the moving body and the manipulator are coupled to the representation unit for representing the coordinate frame (x-o-y-z) of the moving body and the manipulator coordinate frame (x'-o'-y'-z') of the manipulator to a represented coordinate frame (x, y, z; $q_w, q_x, q_y, q_z$) and a represented manipulator coordinate frame (x', y', z'; $q'_w, q'_x, q'_y, q'_z$), respectively. The general transformation $(x_i, y_i, z_i; q_{wi}, q_{xi}, q_{yi}, q_{zi})$ is configured to transform the coordinate frame (x-o-y-z) to the manipulator coordinate frame (x'-o'-y'-z') by firstly translating the coordinate frame (x-o-y-z) according to the represented translation $(x_i, y_i, z_i)$ and secondly rotating the coordinate frame (x-o-y-z) according to the represented rotation $(q_{wi}, q_{xi}, q_{yi}, q_{zi})$. The represented translation $(x_i, y_i, z_i)$ shows position of coordinate origin of the manipulator coordinate frame (x'-o'-y'-z') in the coordinate frame (x-o-y-z); and the represented rotation $(q_{wi}, q_{xi}, q_{yi}, q_{zi})$ shows orientation of X-axis of the manipulator coordinate frame (x'-o'-y'-z') relative to X-axis of the coordinate frame (x-o-y-z). Therefore, the represented manipulator coordinate frame (x', y', z'; $q'_w, q'_x, q'_y, q'_z$) is obtained by mathematically adding the general transformation $(x_i, y_i, z_i; q_{wi}, q_{xi}, q_{yi}, q_{zi})$ to the represented coordinate frame (x, y, z; $q_w, q_x, q_y, q_z$).

As a result, the pose in the represented expression (such as the first represented pose $(x_1, y_1, z_1; q_{w1}, q_{x1}, q_{y1}, q_{z1})$ and the second represented second pose $(x_2, y_2, z_2; q_{w2}, q_{x2}, q_{y2}, q_{z2})$), the coordinate in the represented expression (such as the represented coordinate frame (x, y, z; $q_w, q_x, q_y, q_z$) and the represented manipulator coordinate frame (x', y', z'; $q'_w, q'_x, q'_y, q'_z$)) and the general transformation $(x_i, y_i, z_i; q_{wi}, q_{xi}, q_{yi}, q_{zi})$ are unified by operation of mathematical addition, which makes the transformative process of the pose or the coordinate frame convenient and bug-free. In particular, the mathematical addition does not meet an exchange law, i.e. A+B does not equal to B+A, wherein A and B stand for the represented poses, the presented coordinate frames, the general transformations, or any combination thereof.

It is well-known that mathematical abstraction of positive numbers equal to mathematical addition of negative numbers. Similarly, mathematical abstraction of the represented poses, the represented coordinate frames, the general transformations, or any combination thereof equal to mathematical addition of negative represented poses, negative represented coordinate frames, negative general transformations, or any combination thereof.

The moving body optionally comprises an autonomous vehicle for moving the manipulator to a pre-determined location automatically. The autonomous vehicle may comprise a Global Navigation Satellite System (GNSS) receiver for locating the autonomous vehicle in a Local Tangent Plane (LTP) coordinate frame or Local Vertical-Local Horizontal (LVLH) coordinate frame, which may be a right-handed system or left-handed coordinate frame. Two commonly adopted right-hand coordinate frames are East-North-Up (ENU) coordinate frame with coordinates (E, N, U) and North-East-Down (NED) coordinate frame with coordinates (N, E, D). The LTP coordinate frame or the LVLH coordinate frame can be transformed to a geographical coordinate frame, such as Earth Centered Earth Fixed (ECEF) coordinate frame with coordinate (x, y, z), and GPS coordinate frame with longitude $\lambda_g$, latitude $\varphi_g$, and altitude $a_g$. The geographical coordinate frame is associated with World Geodetic System (WGS) as a standard for the Global Navigation Satellite System (GNSS). In other words, the moving body can be guided by satellite navigation (such as GPS) under the WGS standard.

With general transformation and the mathematical addition, the GPS coordinate at longitude $\lambda_g$, latitude $\varphi_g$, and altitude $a_g$ could be easily transformed to a pose in local ENU coordinates than traditional matrix multiplications, it is just the result of an addition between the pose (0, 0, 0; $\lambda_g$, $\varphi_g$, 0) and the pose ($a_g$+d($\varphi_g$), 0, 0; π/2, θ, π/2), where d($\varphi$) is the distance from the earth center to the sea level at latitude $\varphi$, i.e., if using geodesy standard of World Geodetic System 1984 (WGS 84), $$d(\varphi) = 6378137/\sqrt{1-\sin^2(\varphi)(2-1/298.257223563)/298.257223563}.$$

For an application of robotics, the manipulator comprises multiple freedoms for moving an end effector freely towards the target. For example, the manipulator optionally comprises six freedoms in six coordinate frames ($x'_1$-$o'_1$-$y'_1$-$z'_1$) to ($x'_6$-$o'_6$-$y'_6$-$z'_6$), respectively. In particular, the six freedoms are represented to six coordinate frames ($x'_1$-$o'_1$-$y'_1$-$z'_1$) to ($x'_6$-$o'_6$-$y'_6$-$z'_6$) to six represented coordinate frames ($x'_1$, $y'_1$, $z'_1$; $q'_{w1}$, $q'_{x1}$, $q'_{y1}$, $q'_{z1}$) to ($x'_6$, $y'_6$, $z'_6$, $q'_{w6}$, $q'_{x6}$, $q'_{y6}$, $q'_{z6}$), respectively. Meanwhile, the general transformation ($x_i$, $y_i$, $z_i$; $q_{wi}$, $q_{xi}$, $q_{yi}$, $q_{zi}$) comprises five general transformations ($x'_{12}$, $y'_{12}$, $z'_{12}$; $q'_{w12}$, $q'_{x12}$, $q'_{y12}$, $q'_{z12}$) to ($x'_{56}$, $y'_{56}$, $z'_{56}$; $q'_{w56}$, $q'_{x56}$, $q'_{y56}$, $q'_{z56}$), for transforming the six represented coordinate frames ($x'_1$, $y'_1$, $z'_1$; $q'_{w1}$, $q'_{x1}$, $q'_{y1}$, $q'_{z1}$) to ($x'_6$, $y'_6$, $z'_6$; $q'_{w6}$, $q'_{x6}$, $q'_{y6}$, $q'_{z6}$) sequentially. Therefore, every two of the six respective coordinate frames ($x'_1$-$o'_1$-$y'_1$-$z'_1$) to ($x'_6$-$o'_6$-$y'_6$-$z'_6$) may be easily transformed to each other by mathematically adding their relevant general transformations of the five general transformations ($x'_{12}$, $y'_{12}$, $z'_{12}$; $q'_{w12}$, $q'_{x12}$, $q'_{y12}$, $q'_{z12}$) to ($x'_{56}$, $y'_{56}$, $z'_{56}$; $q'_{w56}$, $q'_{x56}$, $q'_{y56}$, $q'_{z56}$).

The driving mechanism optionally comprises an interpretation unit for interpreting the general transformation ($x_i$, $y_i$, $z_i$; $q_{wi}$, $q_{xi}$, $q_{yi}$, $q_{zi}$) to the geographical coordinate frame (such as the ECEF coordinate frame) for indicating movements of translation and rotation of the autonomous vehicle in the geographical coordinate system. As discussed above, the geographical coordinate frame is associated with the WGS standard for the Global Navigation Satellite System (GNSS); and thus the autonomous vehicle can be guided by satellite navigation (such as GPS) under the WGS standard.

As a second aspect, the present application discloses a computing system for controlling movement of the autonomous machine of the first aspect of the present application for reaching a target. The computing system comprises a memory for storing a series of instructions; a detecting mechanism (such as sensor) for detecting an initial pose (x, y, z; ψ, θ, φ) of the autonomous machine in an initial coordinate frame (x-o-y-z) and a final pose (x', y', z'; ψ', θ', φ') of the autonomous machine in a final coordinate frame (x'-o'-y'-z'); one or more processors operatively coupled to the memory and the detecting mechanism; and an activating mechanism for activating the autonomous machine to move according to a general transformation ($x_i$, $y_i$, $z_i$; $q_{wi}$, $q_{xi}$, $q_{yi}$, $q_{zi}$). The initial pose (x, y, z; ψ, θ, φ) comprises an initial position (x, y, z) and an initial orientation (ψ, θ, φ); and the final pose (x', y', z'; ψ', θ', φ') comprises a final position (x', y', z') and a final orientation (ψ', θ', φ').

The process has several functions: firstly, the process converts the initial pose (x, y, z; ψ, Θ, φ) into an initial transformation (x, y, z; $q_w$, $q_x$, $q_y$, $q_z$) in the initial coordinate frame (x-o-y-z); secondly, the process converts the final pose (x', y', z'; ψ', θ', φ') into a final transformation (x', y', z'; $q'_w$, $q'_x$, $q'_y$, $q'_z$) in the final coordinate frame (x'-o'-y'-z'); and finally the processor plans the general transformation ($x_i$, $y_i$, $z_i$, $q_{wi}$, $q_{xi}$, $q_{yi}$, $q_{zi}$) for transforming the initial coordinate frame (x-o-y-z) to the final coordinate frame (x'-o'-y'-z') in order to change the initial transformation (x, y, z; $q_w$, $q_x$, $q_y$, $q_z$) to the final transformation (x', y', z'; $q'_w$, $q'_x$, $q'_y$, $q'_z$). The general transformation ($x_i$, $y_i$, $z_i$, $q_{wi}$, $q_{xi}$, $q_{yi}$, $q_{zi}$) comprises a translation movement for transforming the initial position (x, y, z) to the finial positon and a rotation movement for transforming the initial orientation (ω, θ, φ) to the final orientation (ψ', θ', φ'), and the translation movement is performed before and the rotation movement according to the series of instructions stored in the memory. In particular, the series of instructions comprise mathematical operations of addition exclusively for calculating both the translation movement and the rotation movement.

The autonomous machine optionally comprises a base for provides the initial pose (x, y, z; ω, θ, φ) in the initial coordinate frame (x-o-y-z); and a manipulator coupled to the base for reaching the final pose (x', y', z'; ψ', θ', φ') in a final coordinate frame (x'-o'-y'-z'). The manipulator performs the translation movement and the rotation movement in sequence accordingly to the general transformation ($x_i$, $y_i$, $z_i$; $q_{wi}$, $q_{xi}$, $q_{yi}$, $q_{zi}$) for transforming the initial coordinate frame (x-o-y-z) to the final coordinate frame (x'-o'-y'-z'); meanwhile, the initial transformation (x, y, z; $q_w$, $q_x$, $q_y$, $q_z$) is changed to the final transformation (x', y', z'; $q'_w$, $q'_x$, $q'_y$, $q'_z$).

The manipulator optionally comprises an effector for realizing any pre-determined function to the target. The manipulator may have six freedoms for moving the effector freely towards the target. In some implementations, the manipulator has six motors for activating the six freedoms respectively. In some implementations, the six motors have six linear axes respectively for rotating the manipulator around the six axes independently.

The initial coordinate frame (x-o-y-z) and the final coordinate frame (x'-o'-y'-z') are configured to transform between joint coordinate system and Cartesian coordinate system. In the joint coordinate system, each freedom has its own coordinate frame ($x^i$-$o^i$-$y^i$-z) with a coordinate origin located at its axis; and each freedom would translate along and rotate around its axis. For example, the first freedom has a first coordinate frame ($x^1$-$o^1$-$y^1$-$z^1$) with a coordinate origin of at a first axis; and the first freedom would rotate around the first axis. In particular, the first coordinate frame ($x^1$-$o^1$-$y^1$-$z^1$) overlaps with the initial coordinate frame (x-o-y-z) if the coordinate origin $o^1$ is located at a lower end of the first axis. While the sixth coordinate frame ($x^1$-$o^1$-$y^1$-$z^1$) overlaps with the final coordinate frame (x'-o'-y'-z') if the coordinate origin $o^6$ is located at an upper end of the sixth axis. In contrast, all the six freedoms share a single coordinate frame ($x^s$-$o^s$-$y^s$-$z^s$) in the Cartesian coordinate system, and the single coordinate frame ($x^s$-$o^s$-$y^s$-$z^s$) has its coordinate origin usually at a lower end of the manipulator coupled to the base. Since the coordinate frame ($x^i$-$o^i$-$y^i$-$z^i$) of each freedom could be transformed to the first coordinate frame ($x^1$-$o^1$-$y^1$-$z^1$) of the joint coordinate system with its general transformation ($x_i$, $y_i$, $z_i$; $q_{wi}$, $q_{xi}$, $q_{yi}$, $q_{zi}$), the initial coordinate frame (x-o-y-z) and the final coordinate frame (x'-o'-y'-z') can be transformed between the joint coordinate system and Cartesian coordinate system through the general transformation $(x_i, y_i, z_i; q_{wi}, q_{xi}, q_{yi}, q_{zi})$ of each freedom in sequence.

The manipulator optionally further comprises seven links for coupling the base and the effector together. In some implementations, the links are rigid and cannot elongate or shorten, but the manipulator still has six freedoms for flexibly reaching to the target at any location within a certain range. In other implementations, each link may elongate or shorten along itself for translating the manipulator upwardly or downwardly. For example, each link comprises an inner shell and an outer shell movably encapsulating the inner shell. The link elongates when the inner shell moves out from the outer shell; while the link shortens when the inner shell moves into the outer shell. Therefore, the manipulator has more flexibility for reaching the target in a wider range.

The autonomous machine optionally comprises an autonomous vehicle, and the detecting mechanism optionally comprises at least one sensor configured to mount on a top of the autonomous vehicle. The sensor is adopted to detect location of the target with a ray having a horizontal angle $\psi_o$, a vertical angle $\theta_o$, and a distance $d_o$ in sensor's coordinate frame. Similarly, the sensor's coordinate frame may be transformed to other coordinate frames with the general transformation $(x_i, y_i, z_i; q_{wi}, q_{xi}, q_{yi}, q_{zi})$ and thus express the location of the target in any of the other coordinate frames.

The autonomous machine may further comprise a Global Navigation Satellite System (GNSS) receiver for providing autonomous geo-spatial positioning in the geographical coordinate frame. For example, the sensor has a longitude $\lambda_{gs}$, latitude $\varphi_{gs}$, and altitude $a_{gs}$ in the GPS coordinate frame, and then the GPS coordinate frame is transformed to any other coordinate frame (such as the sensor's coordinate frame) for comparing positions of the sensor and any other object (such as the sensor). The GNSS receiver may be installed on the autonomous vehicle for moving along with the autonomous vehicle. For example, the GNSS receiver is mounted on the top of the autonomous vehicle. In particular, the GNSS receiver is configured to locate apart from the sensor for reducing error of the geo-spatial positioning.

The GNSS receiver may further comprise a master GNSS antenna and a slave GNSS antenna spaced apart from each other. The master GNSS antenna provides its position in the GPS coordinate frame with a longitude $\lambda_{ga}$, a latitude $\varphi_{ga}$, altitude $a_{ga}$, while the slave GNSS antenna provides orientation of the mater GNSS antenna with a yaw $\psi$, a pitch $\theta$, and a roll $\phi$ relative to the local ENU orientation. As a result, the GNSS receiver is precisely located in the GPS coordinate frame. For example, the sensor is mounted at a left front corner of the top of the autonomous vehicle, and the master GNSS antenna and the slave GNSS antenna are mounted at a right rear corner and a right front corner of the top of the autonomous vehicle, respectively.

As a third aspect, the present application discloses a method of enhancing efficiency of coordinate transformation for moving an autonomous machine towards a target automatically. The method comprises a first step of providing an initial pose $(x, y, z; \psi, \theta, \phi)$ of the autonomous machine, and the initial pose comprises an initial position $(x, y, z)$ and an initial orientation $(\omega, \theta, \phi)$ in an initial coordinate frame $(x\text{-}o\text{-}y\text{-}z)$; a second step of converting the initial pose $(x, y, z; \psi, \theta, \phi)$ into an initial transformation $(x, y, z; q_w, q_x, q_y, q_z)$ in the initial coordinate frame $(x\text{-}o\text{-}y\text{-}z)$; a third step of detecting a final pose $(x', y', z'; \psi', \theta', \phi')$ to which the autonomous machine moves, and the final pose comprises a final position $(x', y', z')$ and a final orientation $(\psi', \theta', \phi')$ in a final coordinate frame $(x'\text{-}o'\text{-}y'\text{-}z')$; a fourth step of converting the final pose $(x', y', z'; \psi', \theta', \phi')$ into a final transformation $(x', y', z'; q'_w, q'_x, q'_y, q'_z)$ in the final coordinate frame $(x'\text{-}o'\text{-}y'\text{-}z')$; a fifth step of planning a general transformation $(x_i, y_i, z_i; q_{wi}, q_{xi}, q_{yi}, q_{zi})$ for transforming the initial coordinate frame $(x\text{-}o\text{-}y\text{-}z)$ to the final coordinate frame $(x'\text{-}o'\text{-}y'\text{-}z')$, and the general transformation $(x_i, y_i, z_i; q_{wi}, q_{xi}, q_{yi}, q_{zi})$ comprises a translation movement for transforming the initial position $(x, y, z)$ to the finial positon $(x', y', z')$ and a rotation movement for transforming the initial orientation $(\psi, \theta, \phi)$ to the final orientation $(\psi', \theta', \phi')$, and the translation movement is performed before the rotation movement; and a sixth step of activating the autonomous machine to move according to the general transformation $(x_i, y_i, z_i; q_{wi}, q_{xi}, q_{yi}, q_{zi})$. In particular, the planning step comprises mathematical operations of addition exclusively for both the translation movement and the rotation movement of the general transformation $(x_i, y_i, z_i; q_{wi}, q_{xi}, q_{yi}, q_{zi})$.

The method optionally comprises a step of coupling a base and a manipulator into the autonomous machine before the first providing step, and the initial pose $(x, y, z; \Psi, \theta, \phi)$ of the autonomous machine is configured to the base.

The coupling step optionally further comprises a step of assembling seven links into the manipulator, and a first link of the manipulator is coupled to the base. The method optionally further comprises a step of coupling an effector at a far end of the manipulator opposed to the base for reaching the target far away from the base.

The method optionally further comprises a step of mounting one or more sensors on a top of an autonomous vehicle as the autonomous machine.

The method optionally further comprises a step of mounting a Global Navigation Satellite System (GNSS) receiver on the top of the autonomous vehicle for providing autonomous geo-spatial positioning, and the GNSS receiver is configured to locate apart from the at least one sensor.

The mounting a GNSS receiver step may further comprise a step of mounting a master GNSS antenna at a right rear corner of the top of the autonomous vehicle; and a step of mounting a slave GNSS antenna at a right front corner of the top of the autonomous vehicle. While the sensor is mounted at a left front corner of the top of the autonomous vehicle.

The accompanying figures (Figs.) illustrate embodiments and serve to explain principles of the disclosed embodiments. It is to be understood, however, that these figures are presented for purposes of illustration only, and not for defining limits of relevant applications.

Figure 1:
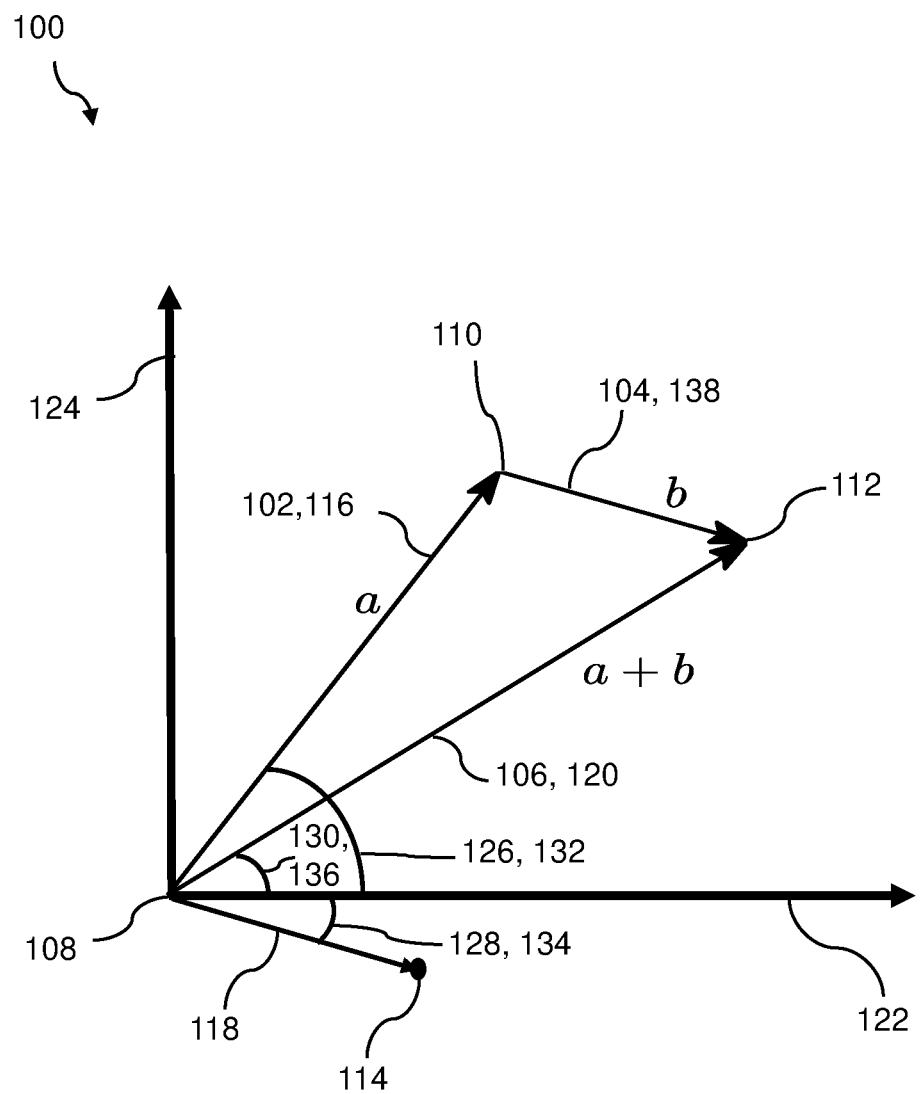
FIG. 1 illustrates a mathematical addition of two poses in a two-dimensional coordinate frame.

FIG. 1 illustrates a mathematical addition of two poses in vector form (x, y, z), a first pose (a) 102 and a second pose (b) 104 in a two-dimensional (2D) coordinate frame 100. A third pose (a+b) 106 also in vector form expresses mathematical addition of the first pose 102 and the second pose 104. The first pose 102 starts from a coordinate origin 108 of the coordinate frame 100 and ends at a first point 110; while the second pose 106 stars from the first point 110 and ends at a second point 112. The second pose 106 may be relocated to also start from the coordinate origin 108 and then ends at a third point 114. In relation to the coordinate origin 108, the first point 110 and the third point 114 represent a first position 116 of the first pose 102 and a second position 118 of the second pose 104 in the coordinate frame 100, respectively. The third pose 106 starts from the coordinate 108 and ends at the second point 112. Similarly, the second point 112 represents a third position 120 of the third pose 106 in relation to the coordinate origin 108 in the coordinate frame 100. The coordinate frame 100 also has an X-axis 122 and a Y-axis 124. The first pose 102, the second pose 104 and the third pose 106 have a first angle 126, a second angle 128 and a third angle 130 to the X-axis 122, which represent a first orientation 132, a second orientation 134 and a third orientation 136 of the first pose 102, the second pose 104 and the third pose 106 in the coordinate frame 100, respectively.

The first orientation 132, the second orientation 134 and the third orientation 136 may be expressed in other forms, such as Euler angles, rotation matrix and quaternion. In a three-dimensional (3D) coordinate frame, an orientation may be expressed in the Euler angle ($\omega$, $\theta$, $\phi$) in order of z-y-x (yaw-pitch-roll), while 3×3 rotation matrix and quaternion ($q_w$, $q_x$, $q_y$, $q_z$). For the Euler angles ($\psi$, $\theta$, $\phi$), rotation of $\psi$ radians around a Z-axis, rotation of $\theta$ radians around a new Y-axis after the Z-axis rotation, and rotation of $\phi$ radians around a new X-axis after the Y-axis rotation. The different forms could be converted to each other. For example, the quaternion ($q_w$, $q_x$, $q_y$, $q_z$) form is obtained from the Euler angles ($\psi$, $\theta$, $\phi$) as below:

$$(q_w, q_x, q_y, q_z) = (\cos(\psi/2)\cos(\theta/2)\cos(\phi/2) + \sin(\psi/2)\sin(\theta/2)\sin(\phi/2), \cos(\psi/2)\cos(\theta/2)\sin(\phi/2) - \sin(\psi/2)\sin(\theta/2)\cos(\phi/2), \sin(\psi/2)\cos(\theta/2)\sin(\phi/2) + \cos(\psi/2)\sin(\theta/2)\cos(\phi/2), \sin(\psi/2)\cos(\theta/2)\cos(\phi/2) - \cos(\psi/2)\sin(\theta/2)\sin(\phi/2)) \quad \text{equation (1)}$$

wherein $q_w^2 + q_x^2 + q_y^2 + q_z^2 = 1$.

Therefore, a pose in the three-dimensional (3D) coordinate frame is expressed as (x, y, z; $q_w$, $q_x$, $q_y$, $q_z$), wherein (x, y, z) and ($q_w$, $q_x$, $q_y$, $q_z$) express a position and a rotation of the pose relative to a coordinate origin of the three-dimensional coordinate frame, respectively.

As a result, the first pose 102 is expressed as ($x_a$, $y_a$, $z_a$; $q_{wa}$, $q_{xa}$, $q_{ya}$, $q_{za}$), the second pose 104 is expressed as ($x_b$, $y_b$, $z_b$; $q_{wb}$, $q_{xb}$, $q_{yb}$, $q_{zb}$), and the third pose 106 is expressed as ($x_c$, $y_c$, $z_c$; $q_{wc}$, $q_{xc}$, $q_{yc}$, $q_{zc}$). If the second pose 104 is viewed as a general transformation 138, the first pose 102 is transformed to the third pose 106 by mathematically adding the first pose 102 ($x_a$, $y_a$, $z_a$; $q_{wa}$, $q_{xa}$, $q_{ya}$, $q_{za}$) and the general transformation 138 ($x_b$, $y_b$, $z_b$; $q_{wb}$, $q_{xb}$, $q_{yb}$, $q_{zb}$), which equals to the third pose 106 ($x_c$, $y_c$, $z_c$; $q_{wc}$, $q_{xc}$, $q_{yc}$, $q_{zc}$).

If the pose in a first coordinate frame is treated as its coordinate origin; the first coordinate frame may be also expressed in the form as (x, y, z; $q_w$, $q_x$, $q_y$, $q_z$), wherein (x, y, z) and ($q_w$, $q_x$, $q_y$, $q_z$) express a position and a rotation of the first coordinate frame in a second coordinate frame in the form as (x', y', z'; $q'_w$, $q'_x$, $q'_y$, $q'_z$). Similarly, a general transformation also in the form as ($x_i$, $y_i$, $z_i$; $q_{wi}$, $q_{xi}$, $q_{yi}$, $q_{zi}$) transforms the first coordinate frame (x, y, z; $q_w$, $q_x$, $q_y$, $q_z$) to the second coordinate frame (x', y', z'; $q'_w$, $q'_x$, $q'_y$, $q'_z$) by mathematically adding the general transformation ($x_i$, $y_i$, $z_i$; $q_{wi}$, $q_{xi}$, $q_{yi}$, $q_{zi}$) to the first coordinate frame (x, y, z; $q_w$, $q_x$, $q_y$, $q_z$).

Figure 2:
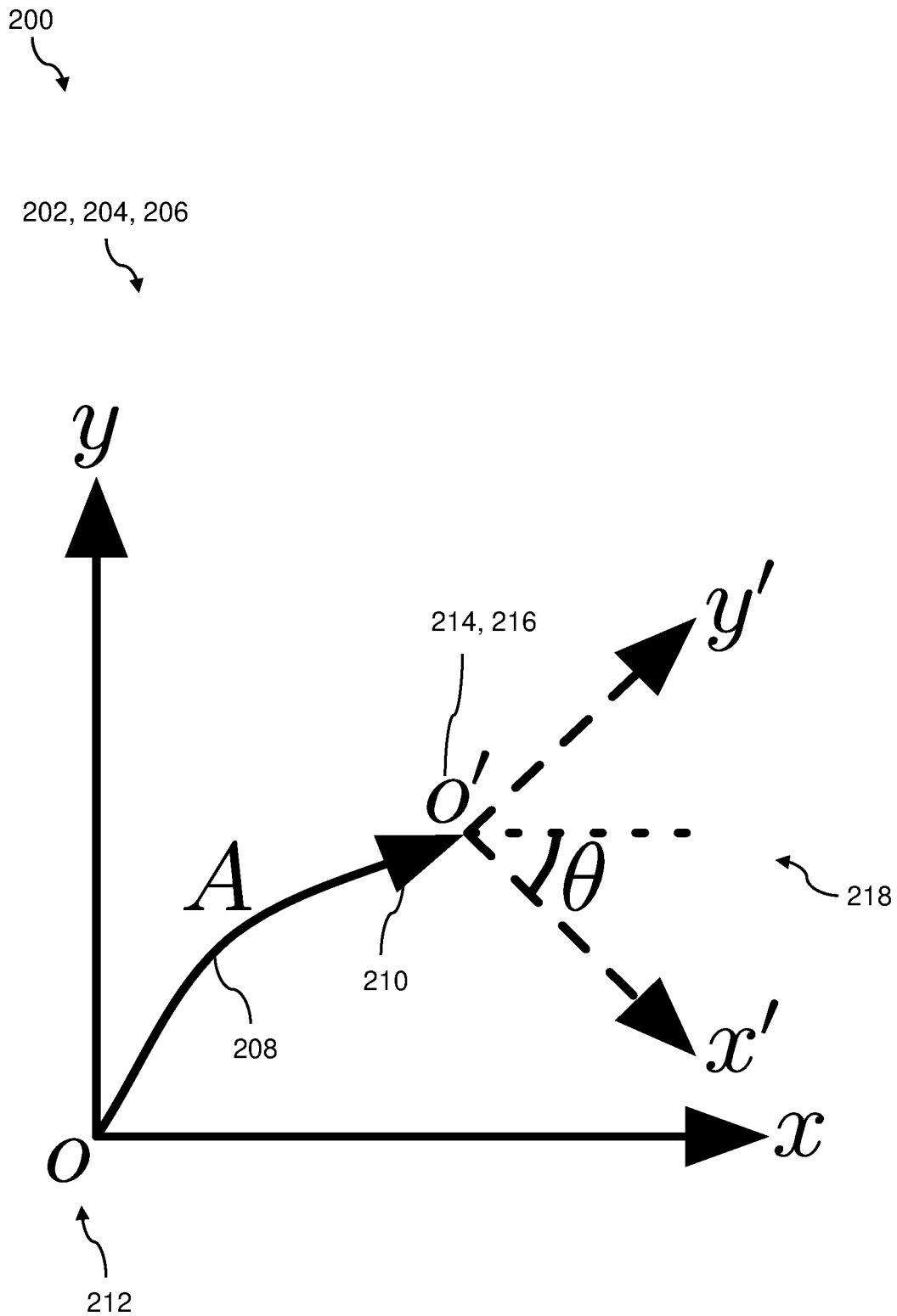
FIG. 2 illustrates unification of a pose, a coordinate frame and a general transformation in a two-dimensional configuration.

FIG. 2 illustrates unification of a pose 202, a coordinate frame 204 and a general transformation 206 in a two-dimensional coordinate frame 200. In contrast to the FIG. 1, the pose 202 is not a vector and is represented as a curve 208 with an arrow 210 relative to a first coordinate frame 212 expressed as (x-o-y). Alternatively, the curve 208 is view as the pose 202 relative to a coordinate pose 214 which is the coordinate origin 216 (o) of the first coordinate frame 212. While the curve 208 is also viewed as second coordinate frame 218 as (x'-o'-y') relative to first coordinate 212 (x-o-y), or relative to the coordinate pose 214 (o). The curve 208 is also viewed as the general transformation 206 for transforming the first coordinate frame 212 (x-o-y) to the second coordinate frame 218 (x'-o'-y'). Therefore, the pose 202, the coordinate frame 204 (either the first coordinate frame 212 or the second coordinate frame 218) and the general transformation 206 as unified in the expression which is convenient for operation of mathematical addition.

Figure 3:
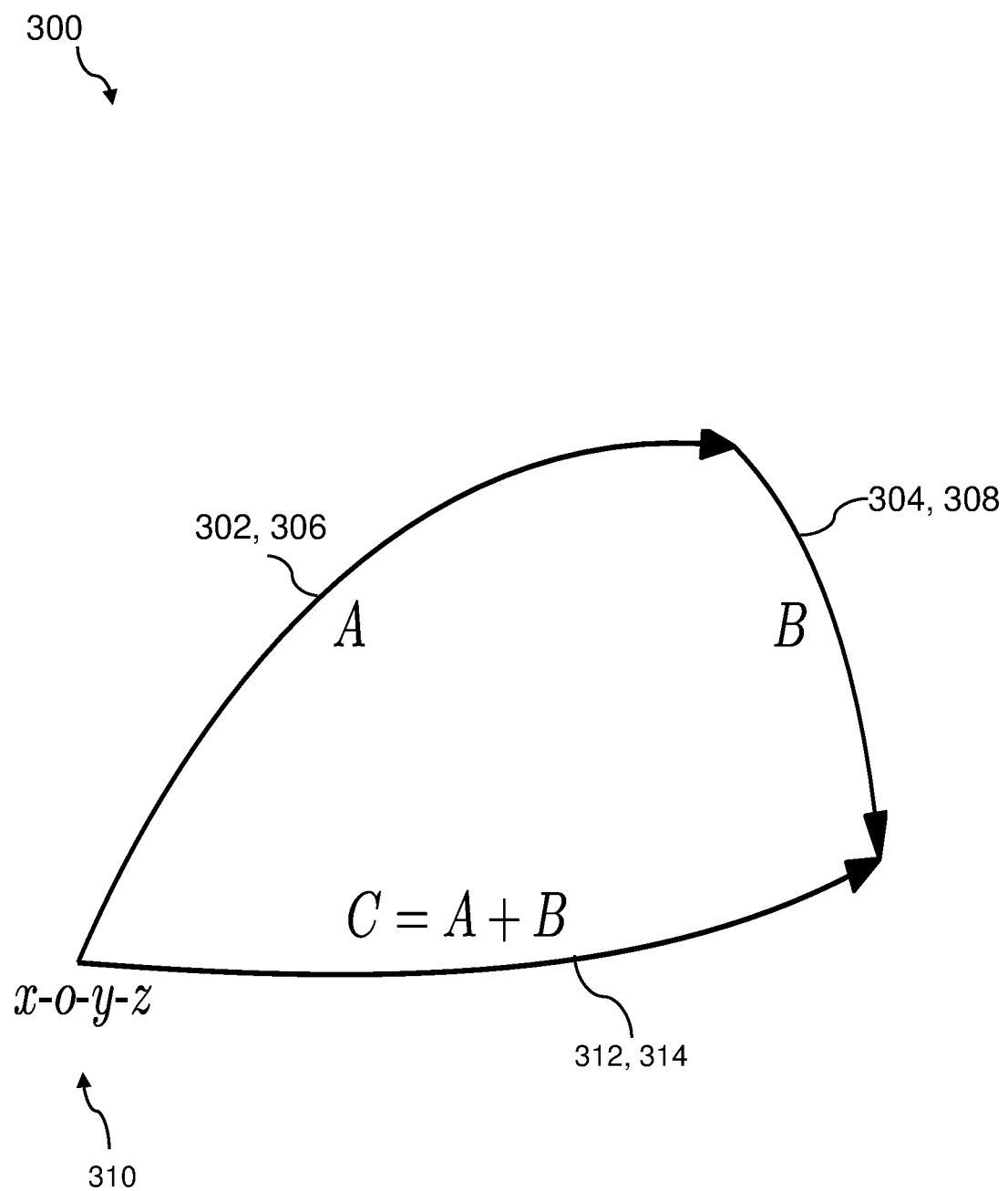
FIG. 3 illustrates a mathematic addition of two poses in a two-dimensional coordinate frame.

FIG. 3 illustrates a mathematic addition of two poses (i.e. a first pose 302 and a second pose 304) in a two-dimensional coordinate frame 300 (x-o-y). The first pose 302 and the second pose 304 are represented by a curve A 306 and a curve B 308, respectively. A mathematical addition of the first pose 302 and the second pose 304 (A+B) equals to a third pose 312 which is represented by a curve C 314 in the coordinate frame 300 (x-o-y). The mathematical addition is calculated as below:

$$C = A + B \quad \text{equation (2)}$$

$$(x'', y'', z''; q''_w, q''_x, q''_y, q''_z) = (x, y, z; q_w, q_x, q_y, q_z) + (x', y', z'; q'_w, q'_x, q'_y, q'_z)$$

$$= (x + x'(q_w^2 + q_x^2 - q_y^2 - q_z^2) + 2y'(q_xq_y - q_wq_z) + 2z'(q_xq_z + q_wq_y),$$

$$y + 2x'(q_xq_y + q_wq_z) + y'(q_w^2 - q_x^2 + q_y^2 - q_z^2) + 2z'(q_yq_z - q_wq_x),$$

$$z + 2x'(q_xq_z - q_wq_y) + 2y'(q_yq_z + q_wq_x) + z'(q_w^2 - q_x^2 - q_y^2 + q_z^2);$$

-continued $$q_w q'_w - q_x q'_x - q_y q'_y - q_z q'_z,$$

$$q_x q'_w + q_w q'_x + q_z q'_y - q_y q'_z,$$

$$q_y q'_w - q_z q'_x + q_w q'_y + q_x q'_z,$$

$$q_z q'_w + q_y q'_x - q_x q'_y + q_w q'_z)$$

wherein A is expressed as (x, y, z; $q_w$, $q_x$, $q_y$, $q_z$), B is expressed as (x', y', z'; $q'_w$, $q'_x$, $q'_y$, $q'_z$), and C is also expressed as (x", y", z"; $q"_w$, $q"_x$, $q"_y$, $q"_z$). Similarly, if the curves A, B and C represent three coordinate frames or three transformations, the mathematical addition above is also applicable to the coordinate frame or the transformation. In contrast to ordinary addition in algebra, the mathematical addition above does not satisfy exchange law, i.e. A+B≠B+A in the equation (2).

Figure 4:
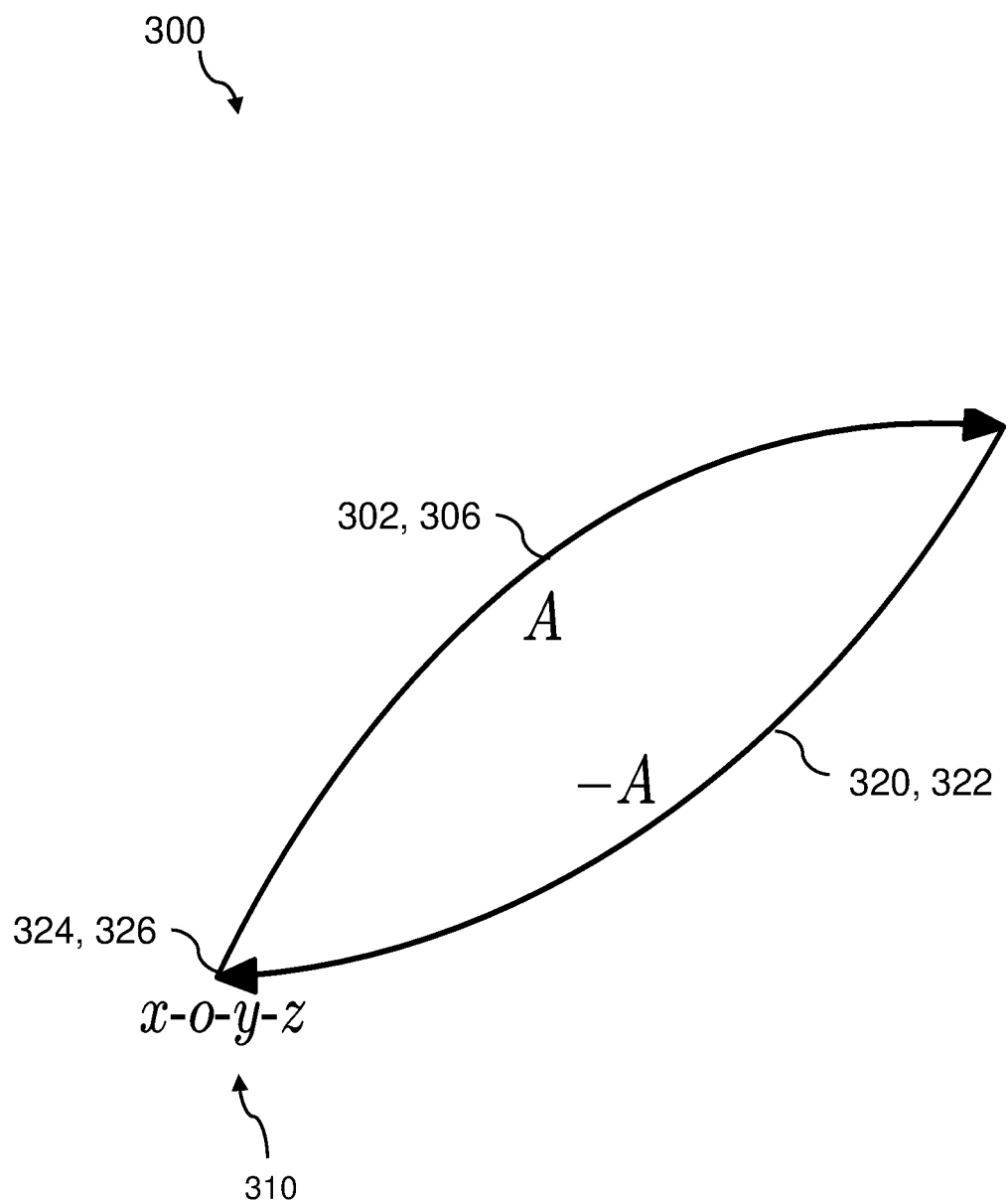
FIG. 4 illustrates an inverse pose in the two-dimensional coordinate frame of FIG. 3.

FIG. 4 illustrates an inverse pose 320 to the first pose 302 represented by the curve A 306 in the coordinate frame 300. The inverse pose 320 is represented by a curve (−A) 322 which forms a closed cycle with the curve A 306. The inverse pose 320 is calculated from the first pose 302 as below:

$$B = -A \qquad \text{equation (3)}$$

$$(x', y', z'; q'_w, q'_x, q'_y, q'_z) = -(x, y, z; q_w, q_x, q_y, q_z)$$

$$= (-x(q_w^2 + q_x^2 - q_y^2 - q_z^2) - 2y(q_x q_y + q_w q_z) - 2z(q_x q_z - q_w q_y),$$

$$-2x(q_x q_y - q_w q_z) - y(q_w^2 - q_x^2 + q_y^2 - q_z^2) - 2z(q_y q_z + q_w q_x),$$

$$-2x(q_x q_z + q_w q_y) - 2y(q_y q_z - q_w q_x) - z(q_w^2 - q_x^2 - q_y^2 + q_z^2);$$

$$q_w, -q_x, -q_y, -q_z)$$

wherein the A is expressed as (x, y, z; $q_w$, $q_x$, $q_y$, $q_z$), and (−A) is expressed as (x', y', z'; $q'_w$, $q'_x$, $q'_y$, $q'_z$). As a result, a mathematical subtraction of the first pose 302 is converted to the mathematical addition by converting the first pose 302 to the inverse pose 320. If a pose O 324 is used to denote a special zero pose at coordinate origin 326 of the coordinate frame 310, then the following equations are deduced from the closed cycle: A+(−A)=O; (−A)+A=O; and O+A=A, and A+O=A. The pose O 324 is expressed as (0, 0, 0; 1, 0, 0, 0). The mathematical subtraction is also applicable to the transformation; and similarly a special transformation O 328 is used to mean no translation and no rotation for the transformation.

Figure 5:
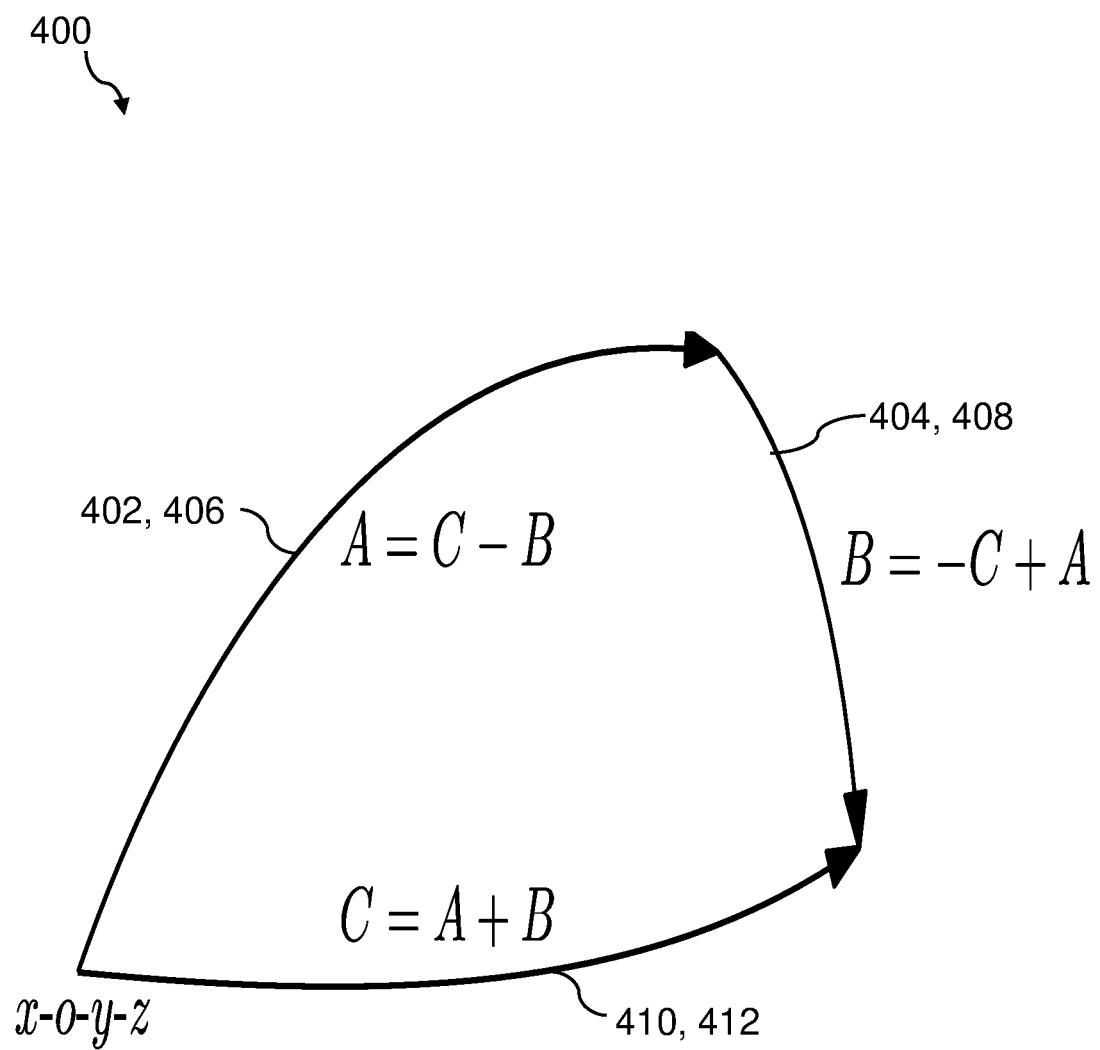
FIG. 5 illustrates a mathematical subtraction of two poses in a two-dimensional coordinate frame.

FIG. 5 illustrates a mathematical subtraction of two poses (i.e. a first pose 402 and a second pose 404) in a two-dimensional coordinate frame 400. The first pose 402 and the second pose 404 are represented by a curve A 406 and a curve B 408, respectively. A third pose 410 is equal to a mathematical addition of the first pose 402 and the second pose 404, which is represented by a curve C. The mathematical addition is expressed as C=A+B. Therefore, the first pose 410 is equal to a mathematical subtraction of the third pose 410 by the second pose 404, which is expressed as A=C−B; while the second pose 404 is equal to a mathematical subtraction of the third pose 410 by the first pose 402, which is expressed as B=−A+C in the coordinate frame 400.

Figure 6:
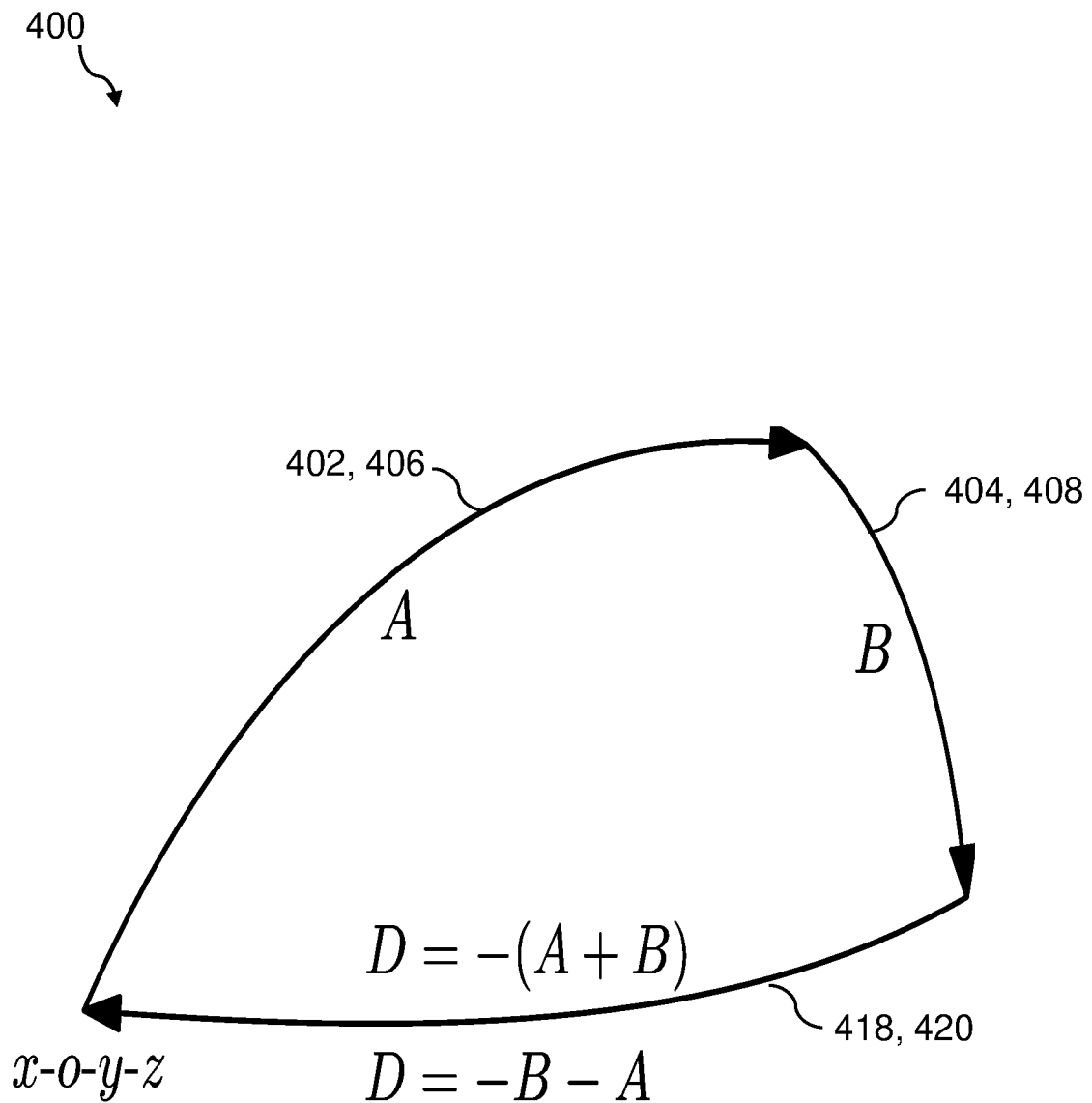
FIG. 6 illustrates a distribution of two inverse poses in the coordinate frame of FIG. 5.

FIG. 6 illustrates a distribution of the two inverse poses (i.e. a first inverse pose 414 inverse to the first pose 402 and a second inverse pose 416 inverse to the second pose 404) in the coordinate frame 400. A third inverse pose 418 is also shown inverse to the third pose 410 which is represented by a curve D. The third inverse pose 418 is thus expressed as D=−(A+B), which is distributed as D=−B−A, but not D=−A−B, since:

$$-(A+B)+(A+B)=O$$

$$-(A+B)+A+B=O$$

$$-(A+B)+A=-B$$

$$-(A+B)=-B-A\ne A-B$$

Different expressions of the pose, the coordinate frame or the general transformation may be converted to each other. For example, the pose expressed as (x, y, z; $q_w$, $q_x$, $q_y$, $q_z$) is converted to expression as (x, y, z; ψ, θ, φ) by following the conversion method below:

$$\psi = \tan^{-1}(2(q_x q_y + q_w q_z)/(q_w^2 + q_x^2 - q_y^2 - q_z^2))$$

$$\theta = \sin^{-1}(2(q_w q_y - q_x q_z))$$

$$\phi = \tan^{-1}(2(q_y q_z + q_w q_x)/(q_w^2 - q_x^2 - q_y^2 + q_x^2)) \qquad \text{equation (4)}$$

Figure 7:
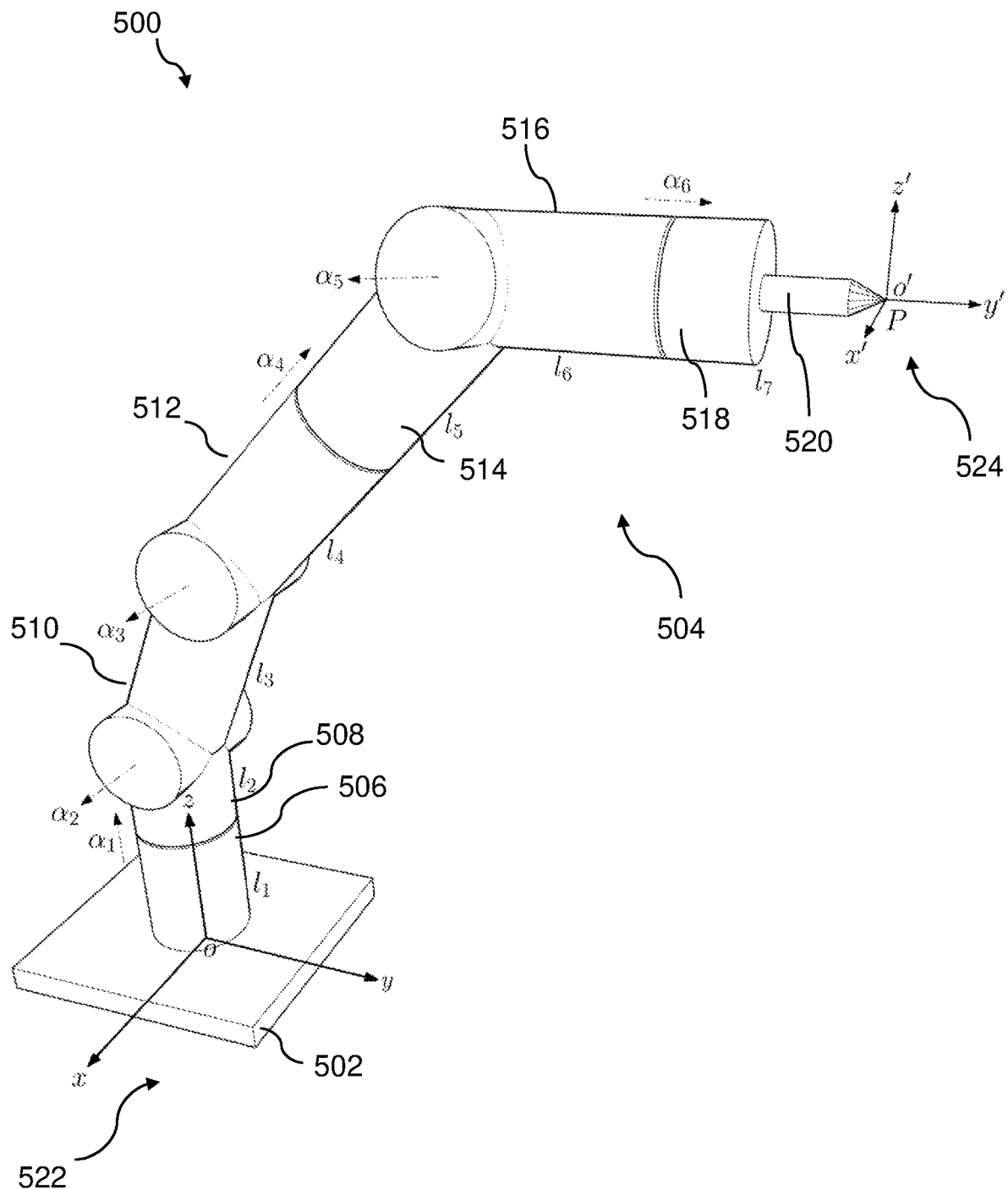
FIG. 7 illustrates an application of kinematics for robotics.

FIG. 7 illustrates an application of kinematics for robotics 500. The robotics 500 has a chassis 502 and a manipulator 504 mounted on the chassis 502. The manipulator 504 has seven links 506-518 coupled in sequence, i.e. a first link 506 coupled to the chassis 502, and the other links 508-518 coupled in sequence. The manipulator further comprises an effector 520 coupled to the seventh link 518. The chassis 502 and the seven links 506-518 are located in a first coordinate frame (x-o-y-z) 522; while the effector 520 is located in a second coordinate frame (x'-o'-y'-z') 524. In particular, the seven links 506-518 are thus expressed as seven poses in the first coordinate frame (x-o-y-z) 522 with their respective heights in a Z-axis direction and respective rotations (except the seventh link 518): the first link 506 has a first height of $l_1$ and a first rotation of $\alpha_1$ around the X-axis; the second link 508 has a second height of $l_2$ and a second rotation of $\alpha_2$ around the Z-axis; the third link 510 has a third height of $l_3$ and a third rotation of $\alpha_3$ around the Z-axis; the fourth link 512 has a fourth height of $l_4$ and a fourth rotation of $\alpha_4$ around the X-axis; the fifth link 514 has a fifth height of $l_5$ and a fifth rotation of as around the Z-axis; the third link 516 has a sixth height of $l_6$ and a sixth rotation of as around the X-axis; and the seventh link 518 has a seventh height of $l_7$, but the seventh link 518 cannot rotate.

Figure 8:
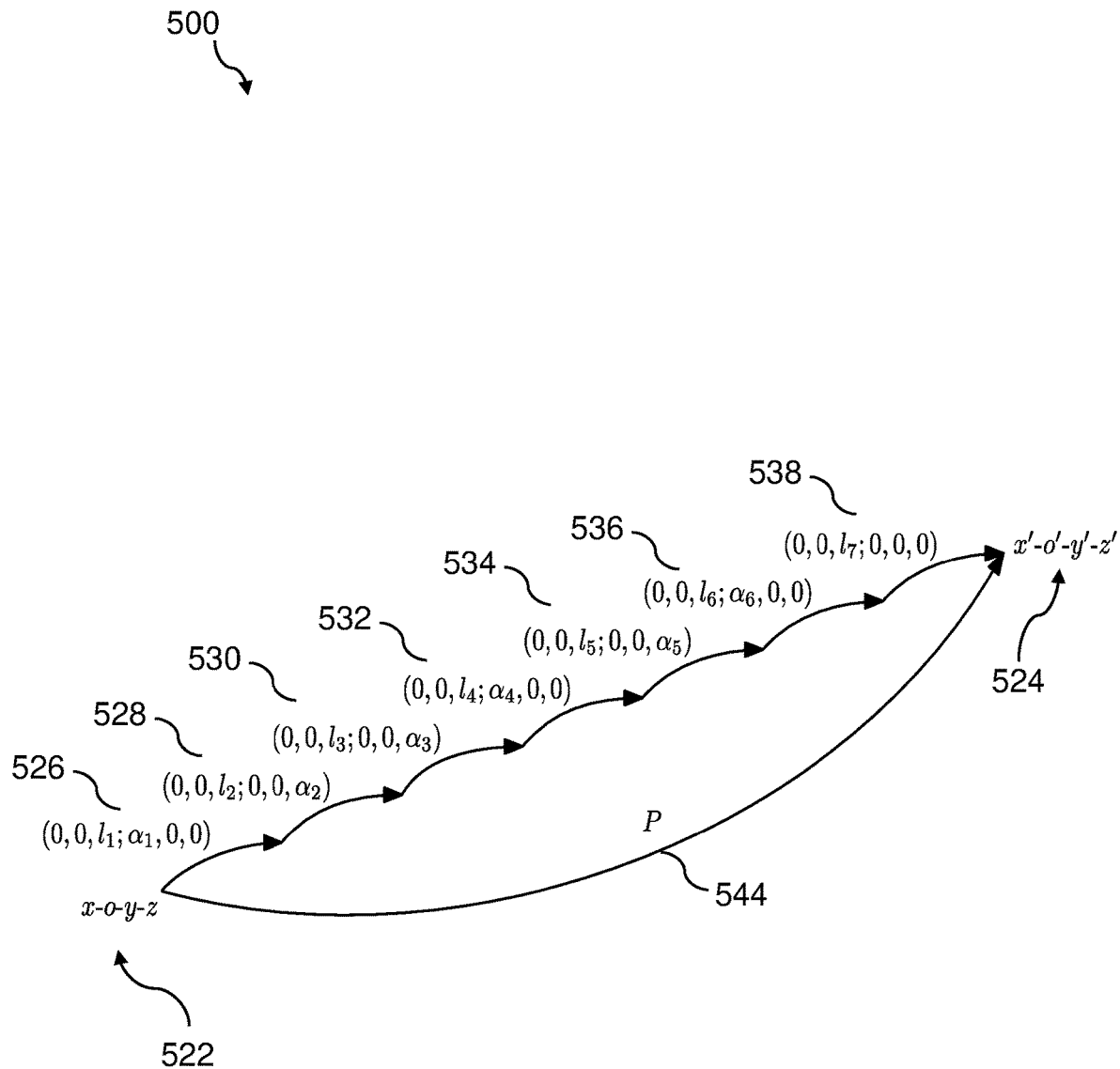
FIG. 8 illustrates an addition chain of the kinematics for robotics.

FIG. 8 illustrates an addition chain of the kinematics for robotics 500. The seven poses of the seven links 506-518 are represented in their represented poses in the first coordinate frame (x-o-y-z) 522, respectively: a first represented pose (0, 0, $I_1$; $\alpha_1$, 0, 0) 526, a second represented pose (0, 0, $I_2$; 0, 0, $\alpha_2$) 528, a third represented pose (0, 0, $I_3$; 0, 0, $\alpha_3$) 530, a fourth represented pose (0, 0, $I_4$; $\alpha_4$, 0, 0) 532, a fifth represented pose (0, 0, $I_5$; 0, 0, $\alpha_5$) 534, a sixth represented pose (0, 0, $I_6$; $\alpha_6$, 0, 0) 536, and a seventh represented pose (0, 0, $I_7$; 0, 0, 0) 538. The effector 520 has an effector represented pose (P) 544 which is easily calculated from the seven represented poses 526-538 as below:

$$P=(0,0,l_1;\alpha_1,0,0)+(0,0,l_2;0,0,\alpha_2)+(0,0,l_3;0,0,\alpha_3)+(0,0,l_4;\alpha_4,0,0)+(0,0,l_5;0,0,\alpha_5)+(0,0,l_6;\alpha_6,0,0)+(0,0,l_7;0,0,0) \quad \text{equation (5)}$$

Meanwhile, the second coordinate frame 524 of the effector 520 is also obtained from the calculation above, in relation to the first coordinate.

Figure 9:
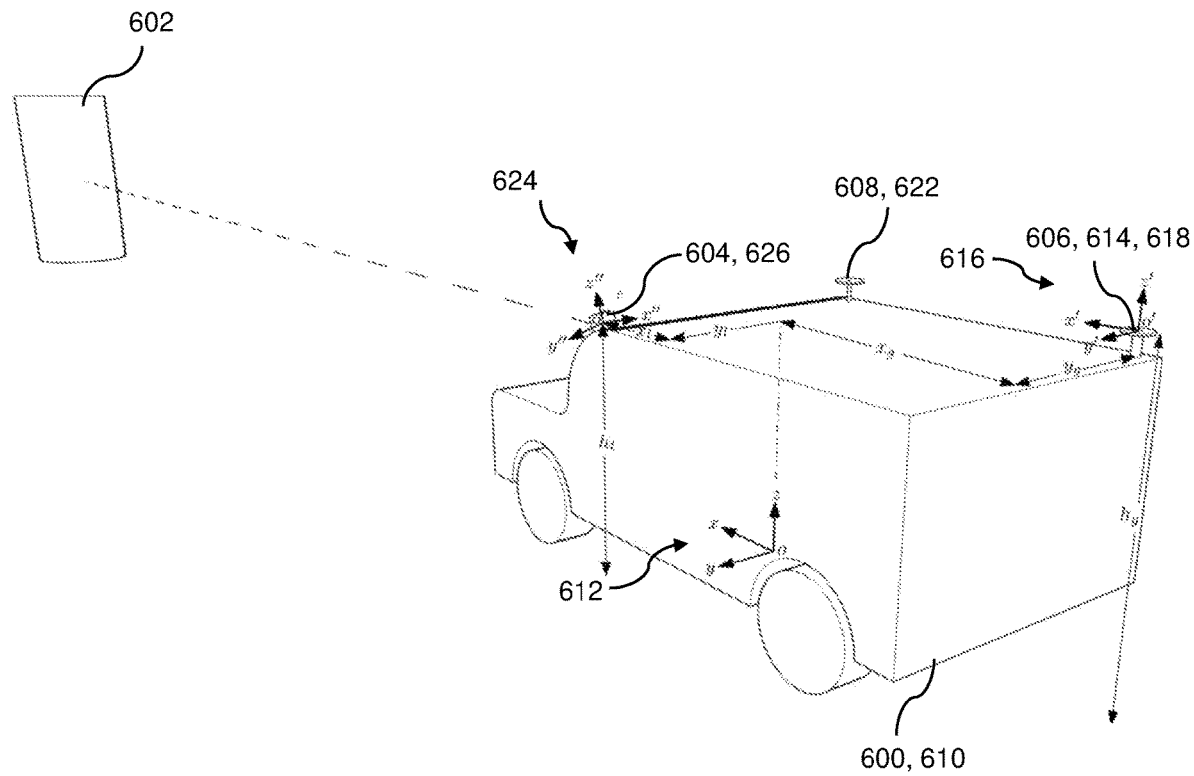
FIG. 9 illustrates an application of autonomous vehicle.

FIG. 9 illustrates an application of autonomous vehicle 600 for reaching a target 602 automatically. The autonomous vehicle 600 has a sensor 604 mounted at a left-front-top position, a master GNSS antenna 606 mounted at a front-right-top position, and a slave GNSS antenna 608 mounted at a rear-right-top position of the autonomous vehicle 600. The autonomous vehicle 600 has a vehicle pose 610 which defines a vehicle coordinate frame 612 (x-o-y-z) in a center of the autonomous vehicle 600 horizontally and on the ground vertically. As a result, the master GNSS antenna 606 has a GNSS antenna pose 614 which defines a GNSS antenna coordinate frame 616 (x-o'-y'-z), whose coordinate origin 618 is located at ($x_g$, $y_g$, $h_g$; 0, 0, 0) in the vehicle coordinate frame 612 (x-o-y-z). The slave GNSS antenna 608 is used to provide an orientation of the autonomous vehicle 600 in East-North-Up (ENU) coordinate frame 620 (not shown) with the master GNSS antenna 606 together. The sensor 604 has a sensor pose 622 which defines a sensor coordinate frame 624 (x"-o"-y"-z"), whose coordinate origin 626 is located at ($x_l$, $y_l$, $h_l$; $\pi/2$, 0, $\phi_l$) in the vehicle coordinate frame 612 (x-o-y-z).

Figure 10:
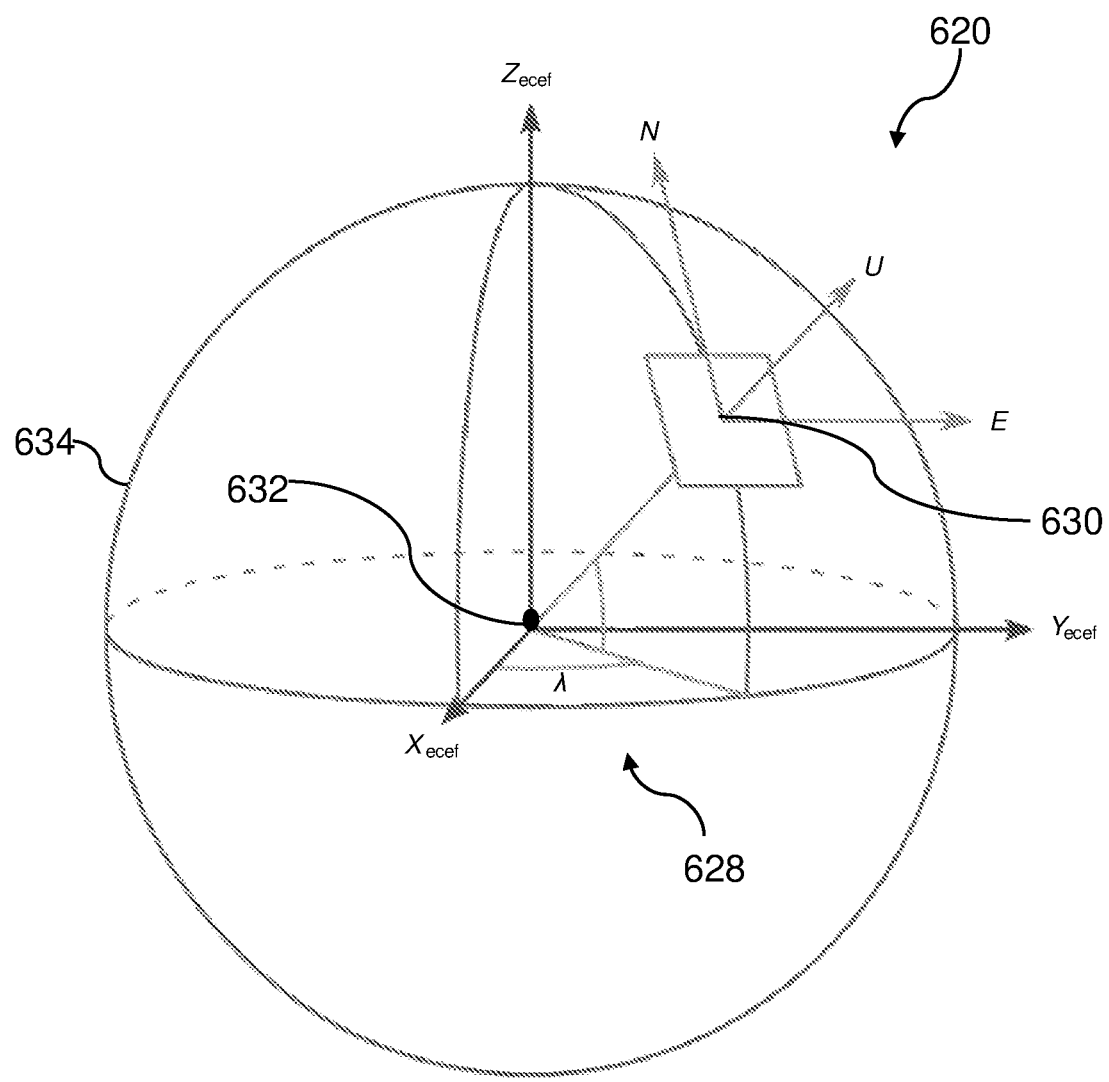
FIG. 10 illustrates an East-North-Up (ENU) coordinate frame in an Earth Centered Earth Fixed (ECEF) coordinate frame.

FIG. 10 illustrates the East-North-Up (ENU) coordinate frame 620 in an Earth Centered Earth Fixed (ECEF) coordinate frame 628. For a point P 630 having a longitude $\lambda$, a latitude $\varphi$, and an altitude a in the ECEF coordinate frame 628, the point P 630 has a pose as (0, 0, 0; $\lambda$, $\varphi$, 0)+(a+d($\varphi$), 0, 0; $\pi/2$, 0, $\pi/2$) in the ENU coordinate frame 620, relative to the earth center 632, wherein d($\varphi$) stands for a distance from the sea level at point P 630 to the earth center 632 of the earth 634 calculated from the latitude $\varphi$ base on geodesy standards of World Geodetic System, such as WGS 84.

Figure 11:
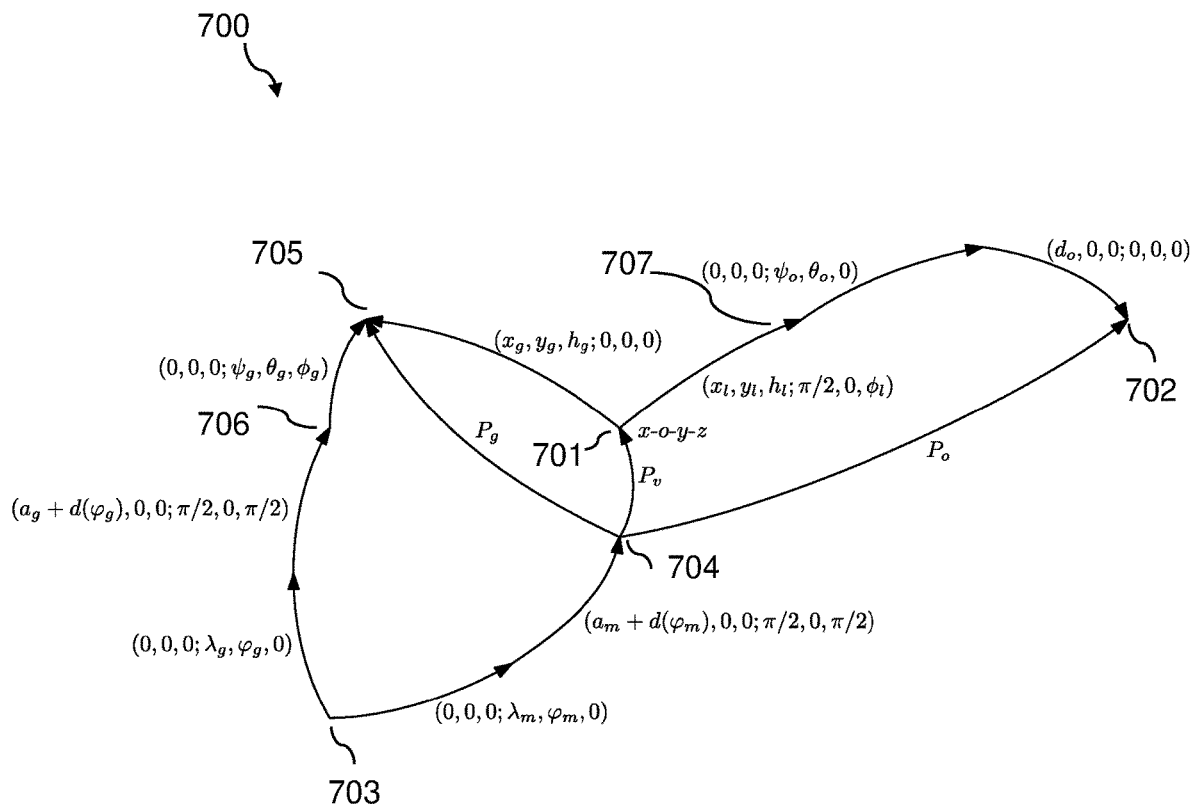
FIG. 11 illustrates an addition chain of the autonomous vehicle.

FIG. 11 illustrates a map 700 of an addition chain of the autonomous vehicle 600. The coordinate of the autonomous vehicle 600, such as the center of the autonomous vehicle 600, is at an autonomous vehicle position 701. The map 700 is usually using a ENU coordinate frame, whose ENU origin 704 in the map 700 is located at a longitude $\lambda_m$, a latitude $\varphi_m$, and an altitude $a_m$ in a ECEF coordinate frame with an ECEF origin 703; the master GNSS antenna 606 provides a master antenna position 706 at a longitude $\lambda_g$, a latitude $\varphi_g$, and an altitude $a_g$; and the slave GNSS antenna 605 provides a mater GNSS antenna orientation 705 at yaw $\psi_g$, pitch $\theta_g$, and roll $\phi_g$ relative to the ENU coordinate frame. The sensor 604 at a sensor position 707 detects a position of the target 702 with a ray having a horizontal angle $\psi_o$, a vertical angle $\theta_o$ and a distance $d_o$ in the sensor coordinate frame, then position of the target 702 in the map 700 is calculated as $$P_o = P_v + (x_l, y_l, h_l; \pi/2, 0, \phi_l) + (0,0,0; \psi_o, \theta_o, 0) + (d_o, 0, 0; 0, 0, 0) \quad \text{equation (6)}$$

wherein the vehicle pose $P_v$ in map coordinate is $$P_v = P_g - (x_g, y_g, h_g; 0, 0, 0)$$

and the master GNSS antenna pose in map coordinate is $$P_g = -(a_m + d(\varphi_m), 0, 0; \pi/2, 0, \pi/2) - (0, 0, 0; \lambda_m, \varphi_m, 0) + (0, 0, 0; \lambda_g, \varphi_g, 0) + (a_g + d(\varphi_g), 0, 0; \pi/2, 0, \pi/2) + (0, 0, 0; \psi_g, \theta_g, \psi_g),$$

wherein d($\varphi$) is the distance from the earth center to the sea level at latitude $\varphi$.

Throughout this disclosure, certain embodiments may be disclosed in a range format. The description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

REFERENCE NUMERALS 100 two-dimensional coordinate frame;
102 first pose (a);
104 second pose (b);
106 third pose (a+b);
108 coordinate origin;
110 first point;
112 second point;
114 third point;
116 first position;
118 second position;
120 third position;
122 X-axis;
124 Y-axis;
126 first angle;
128 second angle;
130 third angle;
132 first orientation;
134 second orientation;
136 third orientation;
138 general transformation;
200 two-dimension coordinate frame;
202 pose;
204 coordinate frame;
206 general transformation;
208 curve;
210 arrow;

212 first coordinate frame;
214 coordinate pose;
216 coordinate origin;
218 second coordinate frame;
300 two-dimension coordinate frame;
302 first pose;
304 second pose;
306 curve A;
308 curve B;
312 third pose;
314 curve C;
320 inverse pose;
322 curve (−A);
324 pose O;
326 coordinate origin;
328 transformation O;
400 two-dimension coordinate frame;
402 first pose;
404 second pose;
406 curve A;
408 curve B;
410 third pose;
412 curve C;
414 first inverse pose;
416 second inverse pose;
418 third inverse pose;
420 curve D;
500 robotics;
502 chassis;
504 manipulator;
506 first link;
508 second link;
510 third link;
512 fourth link;
514 fifth link;
516 sixth link;
518 seventh link;
520 effector;
522 first coordinate frame;
524 second coordinate frame;
526 first represented pose;
528 second represented pose;
530 third represented pose;
532 fourth represented pose;
534 fifth represented pose;
536 sixth represented pose;
538 seventh represented pose;
544 effector represented pose (P);
600 autonomous vehicle;
602 target;
604 sensor;
606 master GNSS antenna;
608 slave GNSS antenna;
610 vehicle pose;
612 vehicle coordinate frame;
614 GNSS antenna pose;
616 GNSS antenna coordinate frame;
618 coordinate origin;
620 ENU coordinate frame;
622 sensor pose;
624 sensor coordinate frame;
626 coordinate origin;
628 ECEF coordinate frame;
630 point P;
632 the earth center;
634 the earth;
700 map;
701 autonomous vehicle position;
702 target position;
703 ECEF origin (Earth center);
704 ENU origin;
705 master GNSS antenna orientation;
706 mater GNSS antenna position;
707 sensor position;

The invention claimed is:

1. An autonomous machine (500) comprising:
at least one movable component (506-518);
a representation unit coupled to the at least one movable component (506-518);
a transformation unit communicatively coupled to the representation unit; and
at least one driving mechanism ($\alpha_1$-$\alpha_6$) coupled to the at least one movable component and the transformation unit for moving the at least one component (506-518);
characterized in that each of the at least one movable component (506-518) has a pose (x, y, z; $\psi$, $\theta$, $\phi$) (526-538) in a coordinate frame (x-o-y-z) (522), and the pose (x, y, z; $\psi$, $\theta$, $\phi$) (522-538) is configured to divide into a position (x, y, z) and an orientation ($\psi$, $\theta$, $\phi$); and
the pose (x, y, z; $\psi$, $\theta$, $\phi$) (526-538) is represented in the representation unit to a represented pose in quaternion (x, y, z; $q_w$, $q_x$, $q_y$, $q_z$) in the coordinate frame (x-o-y-z) (522);
wherein the at least one movable component (506-518) comprises
a moving body ($l_1$-$l_6$) configured in the coordinate frame (x-o-y-z) (522); and
a manipulator (504) mounted on the moving body ($l_1$-$l_6$), wherein the manipulator (504) is configured in a manipulator coordinate frame (x'-o'-y'-z') (524), wherein the moving body ($l_1$-$l_6$) and the manipulator (504) are coupled to the representation unit for representing the coordinate frame (x-o-y-z) (522) and the manipulator coordinate frame (x'-o'-y'-z') (524) to a represented coordinate frame (x, y, z; $q_w$, $q_x$, $q_y$, $q_z$) and a represented manipulator coordinate frame (x', y', z'; $q'_w$, $q'_x$, $q'_y$, $q'_z$), respectively; and
the coordinate frame (x-o-y-z) (522) is configured to transform to the manipulator coordinate frame (x'-o'-y'-z') (524) via a general transformation ($x_i$, $y_i$, $z_i$, $q_{wi}$, $q_{xi}$, $q_{yi}$, $q_{zi}$) (138, 206) of the transformation unit by firstly translating the coordinate frame (x-o-y-z) (522) according to the represented translation ($x_i$, $y_i$, $z_i$) and secondly rotating the coordinate frame (x-o-y-z) (522) according to the represented rotation ($q_{wi}$, $q_{xi}$, $q_{yi}$, $q_{zi}$), wherein the translating process and the rotating process are conducted in mathematical addition (544).

2. The autonomous machine (500) of claim 1, wherein
the at least one movable component (506-518) comprises a first object ($l_1$) having a first pose ($x_1$, $y_1$, $z_1$; $\psi_1$, $\theta_1$, $\phi_1$) (526) in the coordinate frame (x-o-y-z) (522), and the first object ($l_1$) is configured to move to a new pose ($x_2$, $y_2$, $z_2$; $\psi_2$, $\theta_2$, $\phi_2$) (528) in the coordinate frame (x-o-y-z) (522), wherein the first pose ($x_1$, $y_1$, $z_1$; $\psi_1$, $\theta_1$, $\phi_1$) (526) and the new pose ($x_2$, $y_2$, $z_2$; $\psi_2$, $\theta_2$, $\phi_2$) (528) are represented in the representation unit to a first represented pose in quaternion ($x_1$, $y_1$, $z_1$; $q_{w1}$, $q_{x1}$, $q_{y1}$, $q_{z1}$) and a new represented pose in quaternion ($x_2$, $y_2$, $z_2$; $q_{w2}$, $q_{x2}$, $q_{y2}$, $q_{z2}$), respectively.

3. The autonomous machine (500) of claim 1, wherein
the at least one movable component (506-518) comprises a first object ($l_1$) having a first pose ($x_1$, $y_1$, $z_1$; $\psi_1$, $\theta_1$, $\phi_1$) (526) and a second object ($l_2$) having a second pose ($x_2$, $y_2$, $z_2$; $\psi_2$, $\theta_2$, $\phi_2$) (528) in the coordinate frame (x-o-y-z) (522), and the first pose ($x_1$, $y_1$, $z_1$; $\psi_1$, $\theta_1$, $\phi_1$) (526) of the first object ($l_1$) is configured to transform to the second pose ($x_2$, $y_2$, $z_2$; $\psi_2$, $\theta_2$, $\phi_2$) (528) of the second object ($l_2$) in the coordinate frame (x-o-y-z) (522), wherein the first pose ($x_1$, $y_1$, $z_1$; $\psi_1$, $\theta_1$, $\phi_1$) (526) and the second pose ($x_2$, $y_2$, $z_2$; $\psi_2$, $\theta_2$, $\phi_2$) (528) are represented in the representation unit to a first represented pose in quaternion ($x_1$, $y_1$, $z_1$; $q_{w1}$, $q_{x1}$, $q_{y1}$, $q_{z1}$) and a second represented pose in quaternion ($x_2$, $y_2$, $z_2$; $q_{w2}$, $q_{x2}$, $q_{x2}$, $q_{z2}$), respectively.

4. The autonomous machine (500) of claim 1, wherein the general transformation ($x_i$, $y_i$, $z_i$; $\psi_i$, $\theta_i$, $\phi_i$) (138, 206) is configured to unify with the pose (x, y, z; $\psi$, $\theta$, $\phi$) (526-538) for satisfying a mathematical addition of the pose (x, y, z; $\psi$, $\theta$, $\phi$) (526-538) and the general transformation ($x_i$, $y_i$, $z_i$; $\psi_i$, $\theta_i$, $\phi_i$) (138, 206) by representing the general transformation ($x_i$, $y_i$, $z_i$; $\psi_i$, $\theta_i$, $\phi_i$) to a represented general transformation ($x_i$, $y_i$, $z_i$; $q_{wi}$, $q_{xi}$, $q_{yi}$, $q_{zi}$).

5. The autonomous machine (500) of claim 4, wherein the general transformation ($x_i$, $y_i$, $z_i$; $\psi_i$, $\theta_i$, $\phi_i$) (138, 206) comprises a translation ($x_i$, $y_1$, $z_1$) for transforming the position (x, y, z), wherein the translation ($x_i$, $y_i$, $z_i$) is configured to unify with the position (x, y, z) for satisfying a mathematical addition of the translation ($x_i$, $y_i$, $z_i$) and the position (x, y, z).

6. The autonomous machine (500) of claim 5, wherein the general transformation ($x_i$, $y_i$, $z_i$; $\psi_i$, $\theta_i$, $\phi_i$) (138, 206) comprises a rotation ($\psi_i$, $\theta_i$, $\phi_i$) for transforming the orientation ($\psi$, $\theta$, $\phi$), wherein the rotation ($\psi_i$, $\theta_i$, $\phi_i$) is configured to unify with the orientation ($\psi$, $\theta$, $\phi$) for satisfying a mathematical addition of the rotation ($\psi_i$, $\theta_i$, $\phi_i$) and the orientation ($\psi$, $\theta$, $\phi$) by representing the rotation ($\psi_i$, $\theta_i$, $\phi_i$) to a represented rotation ($q_{wi}$, $q_{xi}$, $q_{yi}$, $q_{zi}$), wherein the represented rotation ($q_{wi}$, $q_{xi}$, $q_{yi}$, $q_{zi}$) is performed after the translation ($x_i$, $y_i$, $z_i$).

7. The autonomous machine (600) of claim 1, wherein the moving body ($l_1$-$l_6$) comprises an autonomous vehicle (600) for moving the manipulator (504) to a predetermined location automatically, wherein the autonomous vehicle comprises a Global Navigation Satellite System (GNSS) receiver (606, 608) for locating the autonomous vehicle (600) in a geographical coordinate frame.

8. The autonomous machine (500) of claim 7, wherein the manipulator (504) comprises six freedoms in six respective coordinate frames ($x'_1$-$o'_1$-$y'_1$-$z'_1$) to ($x'_6$-$o'_6$-$y'_6$-$z'_6$), wherein the six coordinate frames ($x'_1$-$o'_1$-$y'_1$-$z'_1$) to ($x'_6$-$o'_6$-$y'_6$-$z'_6$) are represented to six represented coordinate frames ($x'_1$, $y'_1$, $z'_1$; $q'_{w1}$, $q'_{x1}$, $q'_{y1}$, $q'_{z1}$) to ($x'_6$, $y'_6$, $z'_6$, $q'_{w6}$, $q'_{x6}$, $q'_{y6}$, $q'_{z6}$), respectively; and
the general transformation ($x_i$, $y_i$, $z_i$, $q_{wi}$, $q_{xi}$, $q_{yi}$, $q_{zi}$) (138, 206) comprises five general transformations ($x'_{12}$, $y'_{12}$, $z'_{12}$; $q'_{w12}$, $q'_{x12}$, $q'_{y12}$, $q'_{z12}$) to ($x'_{56}$, $y'_{56}$, $z'_{56}$, $q'_{w56}$, $q'_{x56}$, $q'_{y56}$, $q'_{z56}$), for transforming the six represented coordinate frames ($x'_1$, $y'_1$, $z'_1$; $q'_{w1}$, $q'_{x1}$, $q'_{y1}$, $q'_{z1}$) to ($x'_6$, $y'_6$, $z'_6$, $q'_{w6}$, $q'_{x6}$, $q'_{y6}$, $q'_{z6}$) sequentially.

9. The autonomous machine (600) of claim 7, wherein the driving mechanism ($\alpha_1$-$\alpha_6$) comprises an interpretation unit for interpreting the general transformation ($x_i$, $y_i$, $z_i$, $q_{wi}$, $q_{xi}$, $q_{yi}$, $q_{zi}$) (138, 206) to the geographical coordinate frame for indicating movements of translation and rotation of the autonomous vehicle (600) in the geographical coordinate system.

10. A computing system for controlling movement of an autonomous machine (500, 600) to reach a target (524, 602), characterized in that the computing system comprising:

a memory for storing a series of instructions;
detecting mechanism (604) for detecting an initial pose (x, y, z; $\psi$, $\theta$, $\phi$) (526) of the autonomous machine (500, 600) in an initial coordinate frame (x-o-y-z) (522) and a final pose (x', y', z'; $\psi'$, $\theta'$, $\phi'$) (538) of the autonomous machine (500, 600) in a final coordinate frame (x'-o'-y'-z') (524), wherein the initial pose (x, y, z; $\psi$, $\theta$, $\phi$) (526) comprises an initial position (x, y, z) and an initial orientation ($\psi$, $\theta$, $\phi$) and the final pose (x', y', z'; $\psi'$, $\theta'$, $\phi'$) (538) comprises a final position (x', y', z') and a final orientation ($\psi'$, $\theta'$, $\phi'$);
at least one processor operatively coupled to the memory and the detecting mechanism (604) for
  i. converting the initial pose (x, y, z; $\psi$, $\theta$, $\phi$) (526) into an initial transformation (x, y, z; $q_w$, $q_x$, $q_y$, $q_z$) in the initial coordinate frame (x-o-y-z) (522);
  ii. converting the final pose (x', y', z'; $\psi'$, $\theta'$, $\phi'$) (538) into a final transformation (x', y', z'; $q'_w$, $q'_x$, $q'_y$, $q'_z$) in the final coordinate frame (x'-o'-y'-z') (524); and
  iii. planning a general transformation ($x_i$, $y_i$, $z_i$, $q_{wi}$, $q_{xi}$, $q_{yi}$, $q_{zi}$) (138, 206) for transforming the initial coordinate frame (x-o-y-z) (522) to the final coordinate frame (x'-o'-y'-z') (524) in order to change the initial transformation (x, y, z; $q_w$, $q_x$, $q_y$, $q_z$) to the final transformation (x', y', z'; $q'_w$, $q'_x$, $q'_y$, $q'_z$), wherein the general transformation ($x_i$, $y_i$, $z_i$, $q_{wi}$, $q_{xi}$, $q_{yi}$, $q_{zi}$) (138, 206) comprises a translation movement for transforming the initial position (x, y, z) (522) to the final position and a rotation movement for transforming the initial orientation ($\psi$, $\theta$, $\phi$) to the final orientation ($\psi'$, $\theta'$, $\phi'$), and wherein the translation movement is performed before and the rotation movement according to the series of instructions stored in the memory; and
an activating mechanism for activating the autonomous machine (500, 600) to move towards the target according to the general transformation ($x_i$, $y_i$, $z_i$, $q_{wi}$, $q_{xi}$, $q_{yi}$, $q_{zi}$) (138, 206);
  wherein the series of instructions comprise mathematical operations of addition exclusively for calculating both the translation movement and the rotation movement of the general transformation ($x_i$, $y_i$, $z_i$, $q_{wi}$, $q_{xi}$, $q_{yi}$, $q_{zi}$) (138, 206), wherein the autonomous machine (500, 600) comprises
  a base (502) for provides the initial pose (x, y, z; $\psi$, $\theta$, $\phi$) in the initial coordinate frame (x-o-y-z); and
  a manipulator (504) coupled to the base for reaching the final pose (x', y', z'; \', $\theta'$, $\phi'$) (538) of the autonomous machine (500, 600) in a final coordinate frame (x'-o'-y'-z') (524), wherein the manipulator (504) performs the translation movement and the rotation movement in sequence accordingly to the general transformation ($x_i$, $y_i$, $z_i$; $q_{wi}$, $q_{xi}$, $q_{yi}$, $q_{zi}$) (138, 206).

11. The computing system of claim 10, wherein the manipulator (504) comprises an effector (520), wherein the manipulator (504) has six freedoms for moving the effector (520) freely towards the target (602).

12. The computing system of claim 10, wherein the initial coordinate frame (x-o-y-z) (522) and the final coordinate frame (x'-o'-y'-z') (524) are configured to transform between joint coordinate system and Cartesian coordinate system.

13. The computing system of claim 10, wherein the manipulator (504) further comprises seven links for coupling the base (502) and the effector (520) together.

14. The computing system of claim 10, wherein
the autonomous machine (600) comprises an autonomous vehicle (600), wherein the detecting mechanism comprises at least one sensor (604) configured to mount on a top of the autonomous vehicle (600).

15. The computing system of claim 14, wherein
the autonomous machine (600) further comprises a Global Navigation Satellite System (GNSS) receiver (606, 608) for providing autonomous geo-spatial positioning, wherein the GNSS receiver (606, 608) is mounted on the top of the autonomous vehicle (600) and configured to locate apart from the at least one sensor (604).

16. The computing system of claim 15, wherein
the GNSS receiver (606, 608) further comprises a master GNSS antenna (606) and a slave GNSS antenna (608) spaced apart, wherein the at least one sensor (604) is mounted at a left front corner of the top of the autonomous vehicle (600), and the master GNSS antenna (606) and the slave GNSS antenna (608) are mounted at a right rear corner and a right front corner of the top of the autonomous vehicle (600), respectively.

17. A method of enhancing efficiency of pose transformation for moving an autonomous machine (500, 600) automatically characterized in that the method comprising:
a step of coupling a base (502) and a manipulator (504) into the autonomous machine (500, 600);
a first step of providing an initial pose (x, y, z; $\psi$, $\theta$, $\phi$) (526) of the autonomous machine (500, 600), wherein the initial pose (x, y, z; $\psi$, $\theta$, $\phi$) (526) of the autonomous machine (500, 600) is configured to the base (502) and the initial pose (x, y, z; $\psi$, $\theta$, $\phi$) (526) comprises an initial position (x, y, z) and an initial orientation ($\psi$, $\theta$, $\phi$) in an initial coordinate frame (x-o-y-z) (522);
a second step of converting the initial pose (x, y, z; $\psi$, $\theta$, $\phi$) (526) into an initial transformation (x, y, z; $q_w$, $q_x$, $q_y$, $q_z$) in the initial coordinate frame (x-o-y-z) (522);
a third step of detecting a final pose (x', y', z'; $\psi'$, $\theta'$, $\phi'$) (538) to which the autonomous machine (500, 600) moves, wherein the final pose (x', y', z'; $\psi'$, $\theta'$, $\phi'$) (538) comprises a final position (x', y', z') and a final orientation ($\psi'$, $\theta'$, $\phi'$) in a final coordinate frame (x'-o'-y'-z') (524);
a fourth step of converting the final pose (x', y', z'; $\psi'$, $\theta'$, $\phi'$) (538) into a final transformation (x', y', z'; $q'_w$, $q'_z$, $q'_y$, $q'_z$) in the final coordinate frame (x'-o'-y'-z') (524);
a fifth step of planning a general transformation ($x_i$, $y_i$, $z_i$; $q_{wi}$, $q_{xi}$, $q_{yi}$, $q_{zi}$) (138, 206) for transforming the initial coordinate frame (x-o-y-z) (522) to the final coordinate frame (x'-o'-y'-z') (524), wherein the general transformation ($x_i$, $y_i$, $z_i$, $q_{wi}$, $q_{xi}$, $q_{yi}$, $q_{zi}$) (138, 206) comprises a translation movement for transforming the initial position (x, y, z) to the final position (x', y', z') and a rotation movement for transforming the initial orientation ($\psi$, $\theta$, $\phi$) to the final orientation ($\psi'$, $\theta'$, $\phi'$), and wherein the translation movement is performed before the rotation movement; and
a sixth step of activating the autonomous machine (500, 600) to move according to the general transformation ($x_i$, $y_i$, $z_i$, $q_{wi}$, $q_{xi}$, $q_{yi}$, $q_{zi}$) (138, 206),
wherein the planning step comprises mathematical operations of addition exclusively for both the translation movement and the rotation movement of the general transformation ($x_i$, $y_i$, $z_i$; $q_{wi}$, $q_{xi}$, $q_{yi}$, $q_{zi}$).

18. The method of claim 17, wherein
the coupling step further comprises a step of assembling seven links (506-518) into the manipulator (504), wherein a first link (506) of the manipulator (504) is coupled to the base (502).

19. The method of claim 18, further comprising:
coupling an effector (520) at a far end of the manipulator (504) opposed to the base (502).

20. The method of claim 17, further comprising:
mounting at least one sensor (604) on a top of an autonomous vehicle (600) as the autonomous machine (500, 600).

21. The method of claim 20, further comprising:
mounting a Global Navigation Satellite System (GNSS) receiver (606, 608) on the top of the autonomous vehicle (600) for providing autonomous geo-spatial positioning, wherein the GNSS receiver (606, 608) is configured to locate apart from the at least one sensor (604).

22. The method of claim 21, wherein
the mounting a GNSS receiver (606, 608) step further comprises
mounting a master GNSS antenna (606) at a right rear corner of the top of the autonomous vehicle (600); and
mounting a slave GNSS antenna (608) at a right front corner of the top of the autonomous vehicle (600), wherein the at least one sensor (604) is mounted at a left front corner of the top of the autonomous vehicle (600).

* * * * *